(12) United States Patent
Keating et al.

(10) Patent No.: US 12,294,910 B2
(45) Date of Patent: May 6, 2025

(54) UE LOCATION VALIDATION FOR PUR IN LEO NETWORKS

(71) Applicant: Nokia Technologies Oy, Espoo (FI)

(72) Inventors: Ryan Keating, Chicago, IL (US); Mads Lauridsen, Gistrup (DK); Jeroen Wigard, Klarup (DK); Rapeepat Ratasuk, Inverness, IL (US)

(73) Assignee: Nokia Technologies Oy, Espoo (FI)

(*) Notice: Subject to any disclaimer, the term of this patent is extended or adjusted under 35 U.S.C. 154(b) by 283 days.

(21) Appl. No.: 17/196,260

(22) Filed: Mar. 9, 2021

(65) Prior Publication Data

US 2022/0295225 A1    Sep. 15, 2022

(51) Int. Cl.
*H04W 4/029* (2018.01)
*H04W 56/00* (2009.01)
(Continued)

(52) U.S. Cl.
CPC ....... *H04W 4/029* (2018.02); *H04W 56/0045* (2013.01); *H04W 64/003* (2013.01); *H04W 72/04* (2013.01)

(58) Field of Classification Search
CPC . H04W 72/23; H04W 72/1268; H04W 72/04; H04W 24/10; H04W 72/0453; H04W 4/029; H04W 56/004; H04W 64/00; H04W 72/0446; H04W 56/006; H04W 72/51; H04W 80/02; H04W 4/02; H04W 52/0216; H04W 56/005; H04W 56/0045; H04W 72/12; H04W 74/002; H04W 48/12; H04W 52/242; H04W 56/0005; H04W 56/0055; H04W 36/32; H04W 56/0015;
(Continued)

(56) References Cited

U.S. PATENT DOCUMENTS 10,080,098 B1 * 9/2018 Edge ............... H04L 63/08
2015/0181481 A1 * 6/2015 Masini ............. H04W 36/322
455/436
(Continued)

FOREIGN PATENT DOCUMENTS

| CN | 112351498 A | * | 2/2021 | ........... H04L 5/0091 |
| CN | 112399548 A | * | 2/2021 | ......... H04B 7/18513 |
| WO | WO-2020030741 A1 | * | 2/2020 | .......... H04W 52/242 |

OTHER PUBLICATIONS

3GPP TSG RAN Meeting #86 "New Study WID on NB-IoT/eTMC Support for NTN" RP-193235. Sitges, Spain Dec. 9-31, 2019.
(Continued)

*Primary Examiner* — Alison Slater
*Assistant Examiner* — Jing Gao
(74) *Attorney, Agent, or Firm* — Joseph C. Drish; McCarter & English, LLP

(57) ABSTRACT

A method including receiving, at a user equipment, one or more location related information, where the location related information comprises information based upon location related to one or more satellite; determining, by the user equipment, timing advance, where the determining is at least partially based upon the location related information; determining, by the user equipment, to perform a preconfigured uplink resource transmission; and performing, based at least partially upon the determined timing advance, the preconfigured uplink resource transmission.

23 Claims, 13 Drawing Sheets

(51) Int. Cl.
*H04W 64/00* (2009.01)
*H04W 72/04* (2023.01)

(58) Field of Classification Search
CPC ......... H04W 36/0072; H04W 52/0212; H04W 64/003; H04W 72/1273; H04W 52/146; H04W 56/0065; H04W 56/009; H04W 72/00; H04W 74/004
See application file for complete search history.

(56) References Cited

U.S. PATENT DOCUMENTS

| | | | | |
|---|---|---|---|---|
| 2015/0312840 A1* | 10/2015 | Kazmi | .................... | H04W 4/02 455/456.2 |
| 2016/0330676 A1* | 11/2016 | Thangarasa | ........... | H04W 48/20 |
| 2021/0168746 A1* | 6/2021 | Mi | ........................ | H04B 17/318 |
| 2022/0232600 A1* | 7/2022 | Kim | .......................... | H04L 1/08 |

OTHER PUBLICATIONS

3GPP TSG RAN WG1 #103-e "Discussion on Power Consumption and NPRACH Capacity for NTN" R1-2008856, E-Meeting, Oct. 26-Nov. 13, 2020.
ETSI TS 136 331 V16.1.1 LTE; Evolved Universal Terrestrial Radio Access (E-UTRA); Radio Resource Control (RRC); Protocol Specification (3GPP TS 36.331 version 16.1.1 Release 16) Jul. 2020.
3GPP TSG RAN WG2 Meeting #113 Electronic "Considerations on PUR in IoT NTN" R2-2101130. Online, Jan. 25-Feb. 5, 2021.
U.S. Appl. No. 63/106,079, filed Oct. 27, 2020.

* cited by examiner

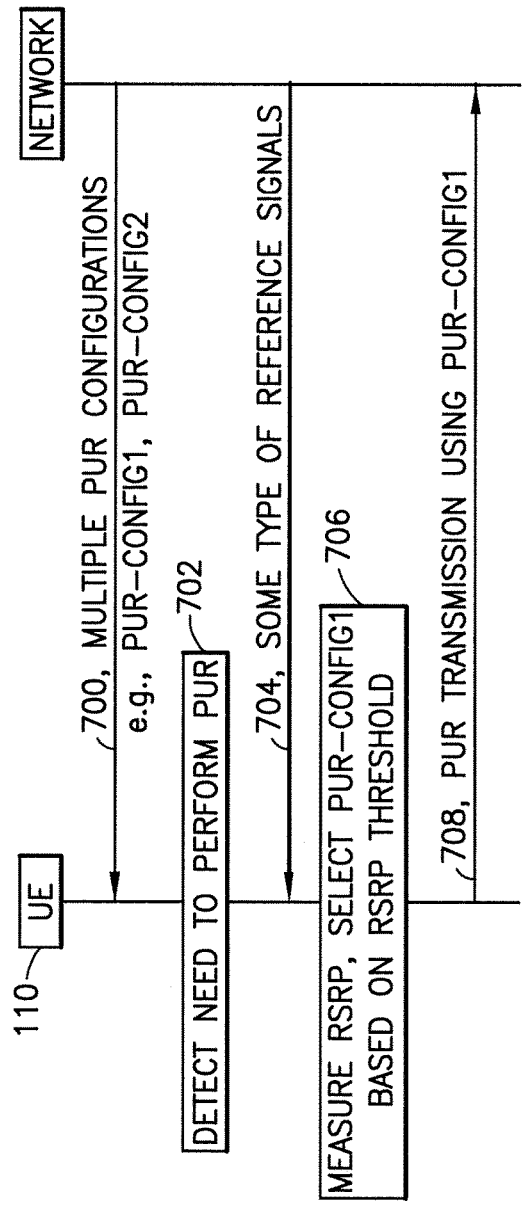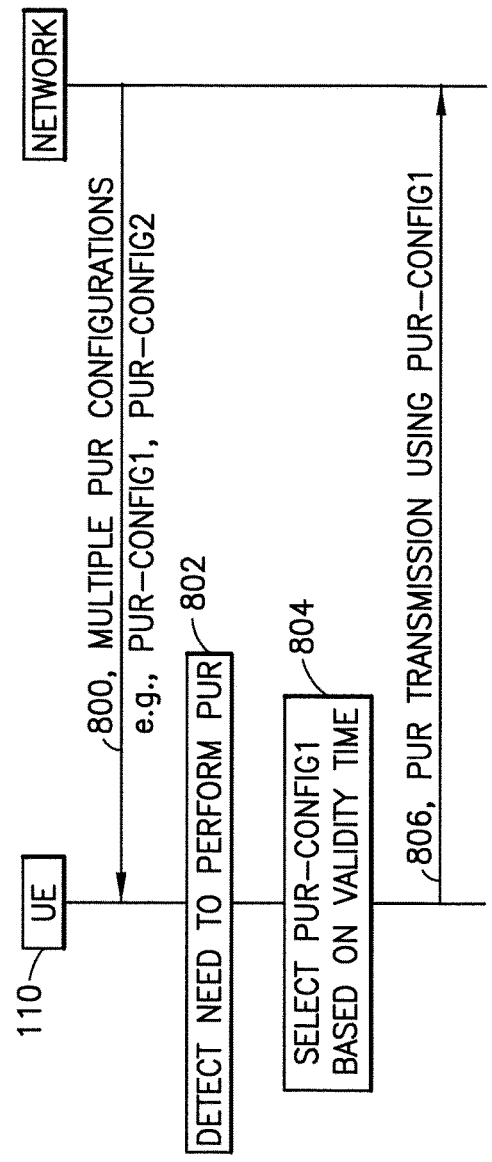

UE LOCATION VALIDATION FOR PUR IN LEO NETWORKS

BACKGROUND

Technical Field

The example and non-limiting embodiments relate generally to wireless communication and, more particularly, to a preconfigured uplink resources transmission.

Brief Description of Prior Developments

Non-Terrestrial Network communications are known, including proposals with use of 3GPP. Currently, communications to support NB-IoT and eMTC with use of a satellite are being studied.

SUMMARY

The following summary is merely intended to be exemplary. The summary is not intended to limit the scope of the claims.

In accordance with one aspect, an example method is provided comprising: receiving, at a user equipment, one or more location related information, where the location related information comprises information based upon location related to one or more satellite; determining, by the user equipment, timing advance, where the determining is at least partially based upon the location related information; determining, by the user equipment, to perform a preconfigured uplink resource transmission; and performing, based at least partially upon the determined timing advance, the preconfigured uplink resource transmission.

In accordance with another aspect, an example embodiment is provided with an apparatus comprising: at least one processor; and at least one non-transitory memory including computer program code, the at least one memory and the computer program code configured to, with the at least one processor, cause the apparatus to: receive, at the apparatus, one or more location related information, where the location related information comprises information based upon location related to one or more satellite; determine, by the apparatus, timing advance, where the determining is at least partially based upon the location related information; determine, by the apparatus, to perform a preconfigured uplink resource transmission; and perform, based at least partially upon the determined timing advance, the preconfigured uplink resource transmission.

In accordance with another aspect, an example embodiment is provided with a non-transitory program storage device readable by a machine, tangibly embodying a program of instructions executable by the machine for performing operations, the operations comprising: receiving, at a user equipment, one or more location related information, where the location related information comprises information based upon location related to one or more satellite; determining, by the user equipment, timing advance, where the determining is at least partially based upon the location related information; determining, by the user equipment, to perform a preconfigured uplink resource transmission; and performing, based at least partially upon the determined timing advance, the preconfigured uplink resource transmission.

In accordance with another aspect, an example method comprises: receiving, by a network, a location information of a user equipment; determining, based at least upon the received location information of the user equipment, one or more location related information, where the location related information comprises information based upon location of at least one satellite of the network; and transmitting, from the network to the user equipment, at least one preconfigured uplink resource configuration including the one or more location related information.

In accordance with another aspect, an example embodiment is provided with an apparatus of a network, the apparatus comprising: at least one processor; and at least one non-transitory memory including computer program code, the at least one memory and the computer program code configured to, with the at least one processor, cause the apparatus to: receive, by the apparatus, a location information of a user equipment; determine, based at least upon the received location information of the user equipment, one or more location related information, where the location related information comprises information based upon location of at least one satellite of the network; and transmit, from the network to the user equipment, at least one preconfigured uplink resource configuration including the one or more location related information.

In accordance with another aspect, an example embodiment is provided with a non-transitory program storage device readable by a machine, tangibly embodying a program of instructions executable by the machine for performing operations, the operations comprising: receiving, by a network, a location information of a user equipment; determining, based at least upon the received location information of the user equipment, one or more location related information, where the location related information comprises information based upon location of at least one satellite of the network; and transmitting, from the network to the user equipment, at least one preconfigured uplink resource configuration including the one or more location related information.

In accordance with another aspect, an example method is provided comprising: determining, at a user equipment, to perform a preconfigured uplink resource transmission; determining, by the user equipment, to: use global navigation satellite system information to determine a location of the user equipment, or use at least positioning assistance data to determine a location of the user equipment, or use one or more location related information to determine or validate the location of the user equipment; comparing the location of the user equipment to a threshold; and selecting, as a result of the comparing, to: perform a preconfigured uplink resource transmission, or transmit a physical random access channel signal.

In accordance with another aspect, an example embodiment is provided with an apparatus of a network, the apparatus comprising: at least one processor; and at least one non-transitory memory including computer program code, the at least one memory and the computer program code configured to, with the at least one processor, cause the apparatus to: determine to perform a preconfigured uplink resource transmission; determine to: use global navigation satellite system information to determine a location of a user equipment, or use at least positioning assistance data to determine the location of the user equipment, or use one or more location related information to determine or validate the location of the user equipment; compare the location of the user equipment to a threshold; and selecting, as a result of the comparing, to: perform a preconfigured uplink resource transmission, or transmit a physical random access channel signal.

In accordance with another aspect, an example embodiment is provided with a non-transitory program storage device readable by a machine, tangibly embodying a program of instructions executable by the machine for performing operations, the operations comprising: determining, at a user equipment, to perform a preconfigured uplink resource transmission; determining, by the user equipment, to: use global navigation satellite system information to determine a location of the user equipment, or use at least positioning assistance data to determine a location of the user equipment, or use one or more location related information to determine or validate the location of the user equipment; comparing the location of the user equipment to a threshold; and selecting, as a result of the comparing, to: perform a preconfigured uplink resource transmission, or transmit a physical random access channel signal.

In accordance with another aspect, an example method is provided comprising: configuring, at a network equipment of a network, a plurality of preconfigured uplink resource configurations; and transmitting, from the network equipment to a user equipment, at least one of the plurality of preconfigured uplink resource configurations, wherein the at least one preconfigured uplink resource configuration is configured, to be used at the user equipment, for a preconfigured uplink resource transmission.

In accordance with another aspect, an example embodiment is provided with an apparatus comprising: at least one processor; and at least one non-transitory memory including computer program code, the at least one memory and the computer program code configured to, with the at least one processor, cause the apparatus to: configure, at a network equipment of a network, a plurality of preconfigured uplink resource configurations; and transmit, from the network equipment to a user equipment, at least one of the plurality of preconfigured uplink resource configurations, wherein the at least one preconfigured uplink resource configuration is configured, to be used at the user equipment, for a preconfigured uplink resource transmission.

In accordance with another aspect, an example embodiment is provided with a non-transitory program storage device readable by a machine, tangibly embodying a program of instructions executable by the machine for performing operations, the operations comprising: configuring, at a network equipment of a network, a plurality of preconfigured uplink resource configurations; and transmitting, from the network equipment to a user equipment, at least one of the plurality of preconfigured uplink resource configurations, wherein the at least one preconfigured uplink resource configuration is configured, to be used at the user equipment, for a preconfigured uplink resource transmission.

In accordance with another aspect, an example method is provided comprising: receiving, by a user equipment, a transmission identifying a plurality of preconfigured uplink resource configurations, where the plurality of preconfigured uplink resource configurations are configured to be used by the user equipment with a preconfigured uplink resource transmission to a satellite assisted network; selecting, by the user equipment, one of the plurality of preconfigured uplink resource configurations; and transmitting, by the user equipment, a signal to a network element the satellite assisted network comprising the selected preconfigured uplink resource configuration.

In accordance with another aspect, an example embodiment is provided with an apparatus comprising: at least one processor; and at least one non-transitory memory including computer program code, the at least one memory and the computer program code configured to, with the at least one processor, cause the apparatus to: receive, by a user equipment, a transmission identifying a plurality of preconfigured uplink resource configurations, where the plurality of preconfigured uplink resource configurations are configured to be used by the user equipment with a preconfigured uplink resource transmission to a satellite assisted network; select, by the user equipment, one of the plurality of preconfigured uplink resource configurations; and transmit, by the user equipment, a signal to the satellite assisted network comprising the selected preconfigured uplink resource configuration.

In accordance with another aspect, an example embodiment is provided with a non-transitory program storage device readable by a machine, tangibly embodying a program of instructions executable by the machine for performing operations, the operations comprising: receiving, by a user equipment, a transmission identifying a plurality of preconfigured uplink resource configurations, where the plurality of preconfigured uplink resource configurations are configured to be used by the user equipment with a preconfigured uplink resource transmission to a satellite assisted network; selecting, by the user equipment, one of the plurality of preconfigured uplink resource configurations; and transmitting, by the user equipment, a signal to the satellite assisted network comprising the selected preconfigured uplink resource configuration.

BRIEF DESCRIPTION OF THE DRAWINGS

The foregoing aspects and other features are explained in the following description, taken in connection with the accompanying drawings, wherein:

FIG. 7 is a diagram illustrating an example method for selection of a preconfigured uplink resources transmission;

FIG. 8 is a diagram illustrating an example method for selection of a preconfigured uplink resources transmission;

DETAILED DESCRIPTION OF EMBODIMENTS

Figure 1:
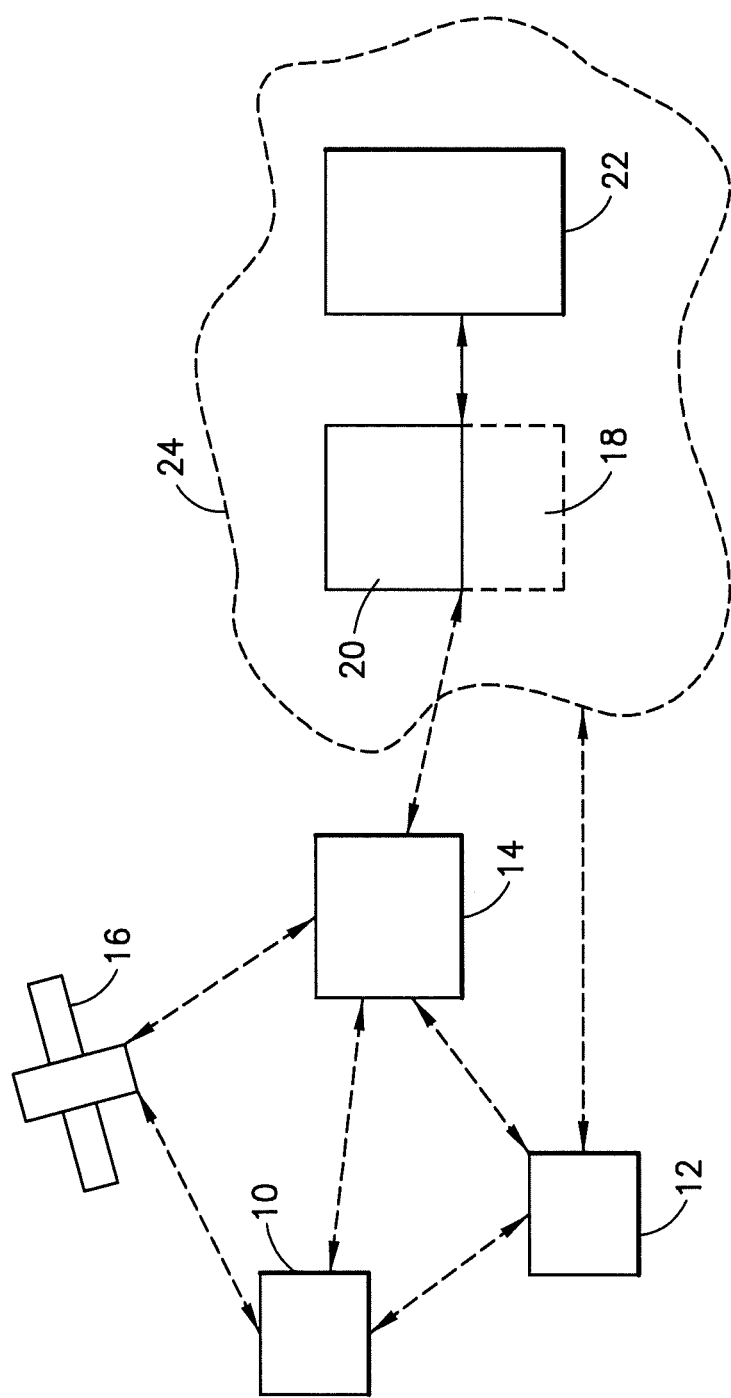
FIG. 1 shows a part of an exemplifying wireless communications access network in accordance with at least some example embodiments.

The following abbreviations that may be found in the specification and/or the drawing figures are defined as follows:

3GPP third generation partnership project
5G fifth generation
5GC 5G core network
ACK acknowledgement
AMF access and mobility management function
BS base station
CN core network
CU central unit
DCI downlink control information
DU distributed unit
EDT Early Data Transmission
eMTC enhanced Machine Type Communication
eNB (or eNodeB) evolved Node B (e.g., an LTE base station)
gNB (or gNodeB) node providing NR user plane and control plane protocol terminations towards the UE, and acting as secondary node in EN-DC
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
GNSS Global Navigation Satellite System
I/F interface
LEO Low Earth Orbit
IoT Internet-Of-Things
LTE long term evolution
MAC medium access control
MCS modulation and coding scheme
MME mobility management entity
NB-IoT Narrowband Internet of Things
ng or NG new generation
ng-eNB or NG-eNB new generation eNB
NR new radio
NTN Non-Terrestrial Network
N/W or NW network
PRB physical resource block
PDCP packet data convergence protocol
PHY physical layer
PUR Preconfigured Uplink Resource
RAN radio access network
Rel release
RLC radio link control
RRH remote radio head
RRC radio resource control
RSRP Reference Signal Received Power
RU radio unit
Rx receiver
SDAP service data adaptation protocol
SIB system information block
SGW serving gateway
SMF session management function
TA Timing Advance
TS technical specification
Tx transmitter
UE user equipment (e.g., a wireless, typically mobile device)
UPF user plane function The example embodiment of FIG. 1 shows a part of a radio access network (RAN). FIG. 1 shows user equipments 10 and 12 configured to be in a wireless connection on one or more communication channels in a cell with an access node 14 (such as a eNodeB or gNodeB for example) with the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server, or access point entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers or transmitters and receivers. From the transceivers of the (e/g)NodeB, a connection is provided to an antenna unit which may establish bi-directional radio links to the user equipment. The antenna unit may comprise a plurality of antennas or antenna elements. The (e/g)NodeB is further connected to core network 20 (such as a CN or next generation core NGC for example). Depending on the system, the counterpart on the CN side may be, for example, a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to as management entities. An example of the network entities include an Access Management Function (AMF).

The user equipment (also known as a UE, a user device, a user terminal, a terminal device, a wireless device, a mobile station (MS), etc.) illustrates one type of an apparatus to which resources on the air interface are allocated and assigned and, thus, any feature described herein with a user equipment may be implemented with a corresponding network apparatus, such as a relay node, an eNB, and an gNB. An example of such a relay node is a layer 3 relay (self-backhauling relay) towards the base station.

A user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. Accordingly, the user equipment may be an IoT-device. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) may be configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals. Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 18).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR). Features as described herein may also be used with future types of networks, such as 6G for example.

5G may also utilize non-terrestrial nodes 16, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 14 or by a gNB located on-ground or in a satellite for example.

The depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells and, thus, a plurality of (e/g)NodeBs are required to provide such a network structure.

Figure 2:
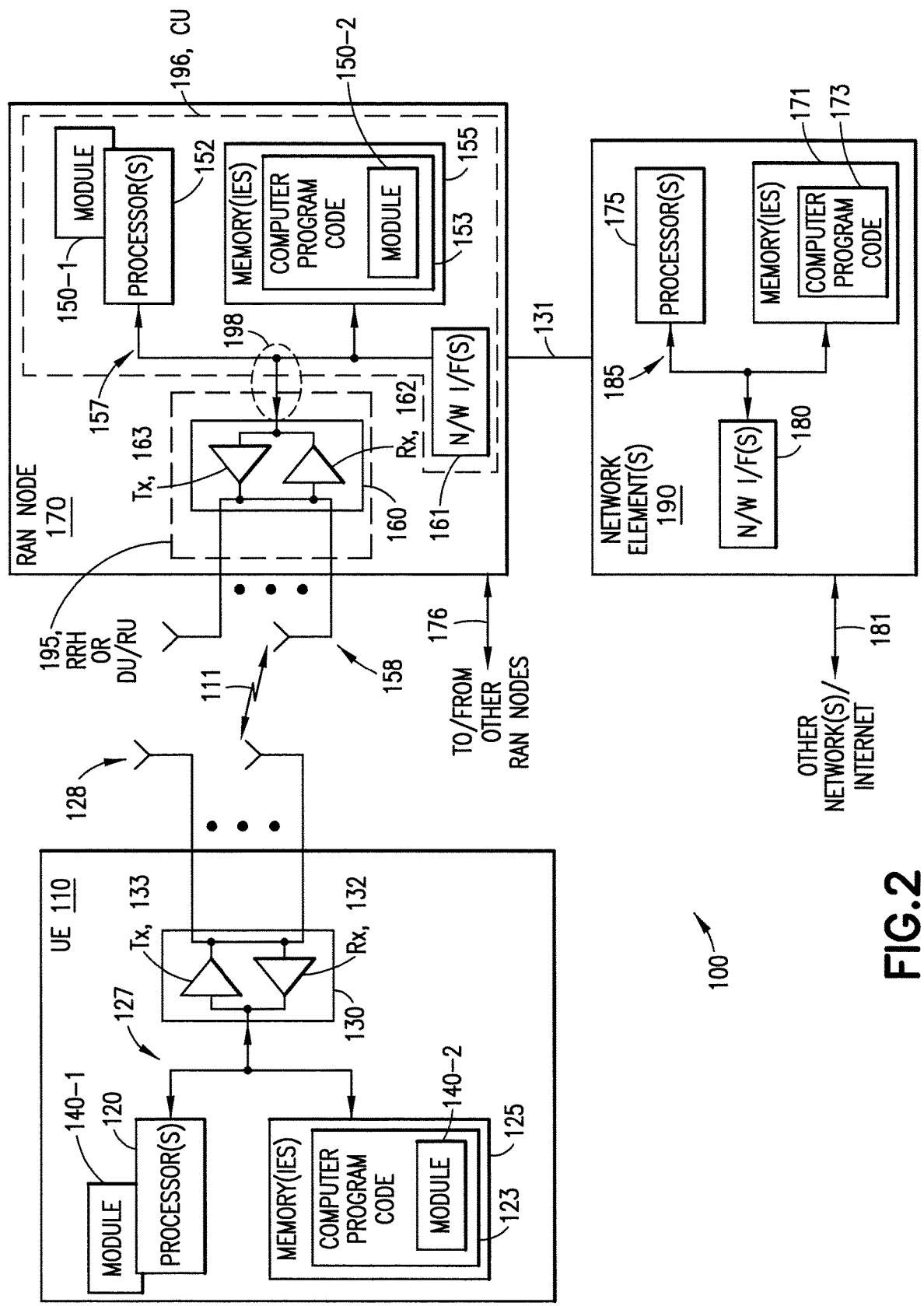
FIG. 2 is a block diagram of one possible and non-limiting exemplary system in which the exemplary embodiments may be practiced.

Turning also to FIG. 2, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110, which may be 10 or 12 shown in FIG. 1 for example, is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The 3GPP is conducting a Rel-17 study item (RP-193235) on support of NB-IoT/eMTC in non-terrestrial networks (NTN). One of the main objectives is "to study and recommend necessary changes to support NB-IoT and eMTC over satellite". The UE would comprise GNSS capability for communication via satellite. In a relaxed measurement mode a GNSS may not be used, such as, for example, if the UE relies on 3GPP-based measurements of signals from the satellite. For the use of GNSS in 1 out of N preconfigured uplink resources occasions, N may be network configured. While GNSS is the most likely technique used, a user equipment could alternatively or additionally find its location based on another technique. So, other location methods may be used such as, for example, IMU, WiFi, or 5G based.

Figure 3:
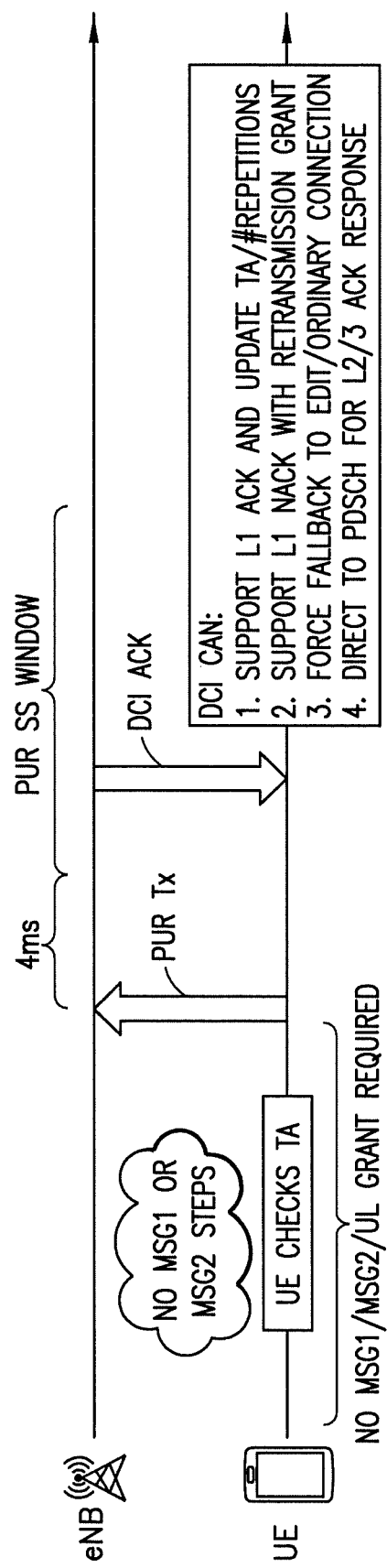
FIG. 3 is a diagram illustrating an example communication between a user equipment and a network equipment using a preconfigured uplink resources transmission rather than a random access procedure.

Features as described herein relate to Preconfigured Uplink Resources (PUR). Currently, there are two types of PUR: dedicated per UE and shared between UEs, who are separated through orthogonal reference signals. PUR was originally specified for terrestrial networks where both a UE and a BS are located on Earth. Features as described herein may use updates which facilitate the use also in non-terrestrial networks. However, features as described herein may also be used for specific terrestrial cases where movement is predictable. Features as described herein may be used to facilitate PUR transmissions towards a satellite (either being terminated there, such as if the BS is onboard, or being relayed to earth if the BS is located on the earth). As used herein, a preconfigured uplink resource (PUR) transmission is a preconfigured uplink resource (PUR) based transmission, or transmission using preconfigured uplink resources (PUR). Functionality features are illustrated in FIG. 3 relating to IoT enhancements in Rel-16. The PUR may lead to power saving for infrequent uplink transmissions of small data packets, because the UE may be able skip the initial Random Access steps (msg1/msg2) if the Timing Advance (TA) is valid. As described herein, timing advance is what a UE may apply to adjust its uplink transmission to ensure time alignment at a receiver (time alignment between uplink transmissions from multiple UEs) within a threshold. Thus, a time alignment timer may be reset whenever the UE gets a new TA (either through TA estimation or network TA command).

The PUR is configured during a prior RRC connection via the information element (IE) PUR-Config (see TS 36.331). Besides configuration of the physical resources in terms of number of resource units, PRBs, MCS and number of repetitions, the IE also contains pur-TimeAlignmentTimer to determine if the TA is still valid, and pur-RSRP-ChangeThreshold which is used to determine if the serving cell RSRP has increased/decreased more than the threshold. If the check of TA and RSRP pass, and the UE has a valid PUR configuration for the serving cell, it may initiate the PUR-based transmission. In a recent RAN2 #113-e email discussion it is proposed to support Early Data Transmission (EDT) and PUR for IoT NTN. Based on companies' contributions it is noted that further enhancements need to be considered. The contributions include the following listed in Table 1:

TABLE 1

| Contribution | Proposals |
|---|---|
| R2-2100165 | Proposal 6: If a UE could derive UE-eNB RTT based on its GNSS capability, the offset for the start of pur-ResponseWindowTimer should be adjusted based on UE-eNB RTT in eMTC/NB-IoT NTN. |
| R2-2100180 | Proposal 2: RAN2 to confirm that EDT & PUR is supported for eMTC/NB-IOT NTN. Proposal 3: an offset is applied to the start of pur-ResponseWindowTimer, and if the start of the pur-ResponseWindowTimer is accurately compensated by UE-gNB RTT, there is no need to extend pur-ResponseWindowTimer value range. |
| R2-2101130 | Proposal 1: RAN2 to consider support of PUR in IoT NTN and study potential issues and enhancements. |

If PUR is to be applied in NTN, the feature should be configured to handle the issues listed in Table 1, but also the general issue of satellite mobility. In low-earth orbit scenarios, where the satellites' altitude is 300 km-1500 km, the movement speed of the satellites relative to Earth is about 7.5 km/s. Therefore, the cell coverage time is limited. In case of earth-moving cells with a diameter as low as 50 km the coverage availability time can be 6-7 s, while it may be up to about 5 minutes for earth-fixed cells. Features as described herein address the problem of utilizing PUR in NTN, where fast satellite movement leads to fast changing coverage conditions, both in terms of RSRP and cell coverage.

According to TS 36.331 v16.1.1 the UE will receive the pur-Config as part of the information received during RRC Release. For example:

5.3.8 RRC Connection Release

1> if the RRCConnectionRelease message includes the pur-Config:
    2> if pur-Config is set to setup:
      3> store or replace the PUR configuration provided by the pur-Config;
      3> if pur-TimeAlignmentTimer is included in the received pur-Config:
        4> configure lower layers in accordance with pur-TimeAlignmentTimer;
      3> else:
        4> if pur-TimeAlignmentTimer is configured, indicate to lower layers that pur-TimeAlignmentTimer is released;
      3> start maintenance of PUR occasions as specified in 5.3.3.20;
    2> else:
      3> if pur-TimeAlignmentTimer is configured, indicate to lower layers that pur-TimeAlignmentTimer is released;
      3> release pur-Config, if configured;
      3> discard previously stored pur-Config;

The UE may initiate the PUR transmission based on the conditions in section 5.3.3.1c 5.3.3.1c Conditions for Initiating Transmission Using PUR A BL UE, UE in CE or NB-IoT UE can initiate transmission using PUR when all of the following conditions are fulfilled:
    1> the UE has a valid PUR configuration for the serving cell as specified in 5.3.3.20;
    1> the UE has a valid timing alignment value as specified in 5.3.3.19;
    1> the upper layers request establishment of an RRC connection; or the upper layers request resumption of an RRC connection and the UE has a stored value of the nextHopChainingCount provided in the RRCConnectionRelease message with suspend indication during the preceding suspend procedure;
    1> the establishment or resumption request is for mobile originating calls and the establishment cause is mo-Data or mo-ExceptionData or delayTolerantAccess;
    1> for CP transmission using PUR, the size of the resulting MAC PDU including the total UL data is expected to be smaller than or equal to the TBS configured for PUR.

The time alignment validation is based on a check of whether the pur-TimeAlignmentTimer is running and potentially also a check of whether the RSRP has changed beyond the decrease/increase thresholds:

5.3.3.19 Timing Alignment Validation for Transmission Using PUR

A UE shall consider the timing alignment value for transmission using PUR to be valid when all of the following conditions are fulfilled:
    1> if pur-TimeAlignmentTimer is configured:
      2> pur-TimeAlignmentTimer is running as confirmed by lower layers;
    1> if pur-RSRP-Change Threshold (pur-NRSRP-Change Threshold in NB-IoT) is configured:
      2> since the last TA validation, the serving cell RSRP has not increased by more than increaseThresh; and
      2> since the last TA validation, the serving cell RSRP has not decreased by more than decreaseThresh;

It is also worth noting that, according to TS 36.331 v16.1.1, if the UE has reselected to a different cell it will release the pur-Config.

5.3.7 RRC Connection Re-Establishment

2> if the UE has a stored pur-Config and the cell is different from the cell where pur-Config was provided:
    3> if pur-TimeAlignmentTimer is configured, indicate to lower layers that pur-TimeAlignmentTimer is released;
    3> release pur-Config;
    3> discard previously stored pur-Config.

In U.S. provisional patent application No. 63/106,079 filed Oct. 27, 2020, which is hereby incorporated by reference in its entirety, it has been proposed to enable reuse of the pur-Config across cells, i.e. enabling the UE to send using PUR even though the UE has reselected to a new cell. This was also hinted in R2-2101130 which describes that:

Another character of NTN is stable orbit of satellite operation which makes the cell movement and/or appearance predictable. Theoretically all satellites that may serve the UE can configure PUR to omit random access. However according to the current specification configuration of PUR is limited to the configuring cell, and therefore UE at least has to initiate random access once in each cell to obtain PUR configuration.

No matter whether the UE has reselected to a new cell or not, the UE needs to validate the TA before transmitting using PUR (see FIG. 2). In NR NTN WI and IoT NTN SI it has been agreed that UE can be assumed to be GNSS capable. This means the UE can estimate the TA by calculating the propagation distance between UE location (obtained via GNSS or any other suitable positioning method) and satellite (based on ephemeris). However, depending on how frequent the UE activates the GNSS the time to obtain a location fix can be quite long, resulting in high energy consumption (see R1-2008856 for examples on cold, warm and hot start of GNSS). While GNSS can be assumed for Rel-17 this may be relaxed in the future. Features as described herein may be applied to any method the UE uses to find its location such as, for example, 5G or WiFi based.

Finnish patent application No. FI20205845 filed on Aug. 31, 2020 proposes to use angle, Doppler and timing advance to verify the position of a user on the network side. Part of the invention, presented in this document, uses the same parameters, but at the UE side to verify whether the UE has moved or not as one out of a number of novel steps.

Features as described herein may be used to define how PUR can be used in IoT over NTN where fast satellite mobility leads to varying propagation delay, varying link loss, and frequent cell changes.

Before the UE initiates PUR, the UE needs to validate the TA; which can be done using GNSS. As previously noted, utilizing a GNSS device frequently increases UE energy consumption. Thus, it is proposed that during initial PUR configuration, the network obtains the UE location (such as, for example, the UE needs to utilize GNSS for the initial location estimation and in a 3GPP NTN work item the GNSS is assumed in the UE). Note also that the UE may store its location as well.

The network may estimate the expected serving cell ID(s) for the next PUR occasion(s) based on satellite orbits. The network may also estimate the RSRP levels the UE can expect, such as based on elevation angle, UE-satellite distance, past ACK/NACK for example. Furthermore, the network may estimate, for example, what Doppler shift, RSRP gradient, and elevation angle the UE can expect. The network may configure the UE with the expected values and associated ranges of these parameters for the next PUR occasion(s). Note that in case of earth-fixed cells, the coverage time may be in the order of minutes and, therefore, the network may make the estimates for at least the current serving cell depending on the PUR periodicity. The choice of specific parameters may be dependent on the UE specific capabilities (e.g., number of antennas). When determining the expected values and the associated ranges, the network may make a trade-off between the allowed margins and the potential interference caused by in-accurate PUR transmission. As an example, a network in a low-load scenario may allow larger ranges, since it is handling less transmissions.

The UE may determine whether to use GNSS or not for PUR validation. This determination may be configured by the gNB and based on certain conditions or triggers, such as for example:

If the UE is in relaxed measurement mode, then it may skip GNSS and try PUR validation using the criteria described in the next paragraph first.

The UE may also be configured to periodically (such as every Nth PUR occasions for example) use GNSS to check its position for verification.

The UE may also be configured (such as, for example, when the TA timer expires) to use GNSS to check its position and re-start the TA timer if its location difference is within a threshold.

Another trigger for using GNSS may be that the RSRP has changed beyond a threshold.

The UE may be configured to use GNSS based on its subscription service.

If GNSS is not used, when UE prepares for PUR, the UE may validate its location by determining if the serving cell ID and/or RSRP and/or Doppler shift and/or RSRP gradient and/or elevation angle (detectable using multiple antennas) matches the network estimates. The validation may comprise the UE determining that its current location is the same as, or near, its former location, such as where the former location was obtained by use of GNSS for example. If the location is validated to be the same as before, the UE may proceed with estimating the TA using the past location estimate and current satellite ephemeris. The estimating of the timing advance may comprise using a validated location of the user equipment and a validated non-expired or a running time alignment timer. Alternatively, after the UE has validated the location, it can also use the location and knowledge about satellite ephemeris to determine the timing advance. If the location is validated, but the PUR transmission fails (such as, for example, the network does not respond with ACK), the UE may fallback to the standardized procedures (EDT or normal random access). If the location is determined to be invalid, (such as, for example, the UE may have moved), the UE may fallback to using GNSS to obtain a new location estimate. Validating, by the user equipment, location of the user equipment may be based upon at least one of received one or more location related information. To apply, for example, the RSRP information received as part of the "location related information" the UE may also need to compare with a RSRP measurement. Likewise the Doppler shift information may need to be compared with a Doppler shift estimated, such as obtained by receiving synchronization signals for example. Thus, the validating may include the comparison with measurements.

If GNSS is used, the UE may determine its location from GNSS. If the UE's location is within a distance threshold from the previous location, the UE may proceed with PUR and estimate its TA as described above. The distance threshold may be configured based on, for example, acceptable TA error at the gNB, or cyclic prefix length (since longer cyclic prefix can accommodate larger TA error). A distance threshold may be configured based upon an acceptable timing advance threshold (or error range or error threshold) or a cyclic prefix length.

With features as described herein, PUR may be facilitated in NTN to reduce the number of messages the UE and network have to send to complete a small data transfer. Considering the long propagation delay and high link loss, this reduces communication delay, UE energy consumption, and signaling overhead. Features as described herein allow for validating UE location prior to PUR, and this may be accomplished without use of GNSS; which may be used to reduce UE energy consumption.

Figure 4:
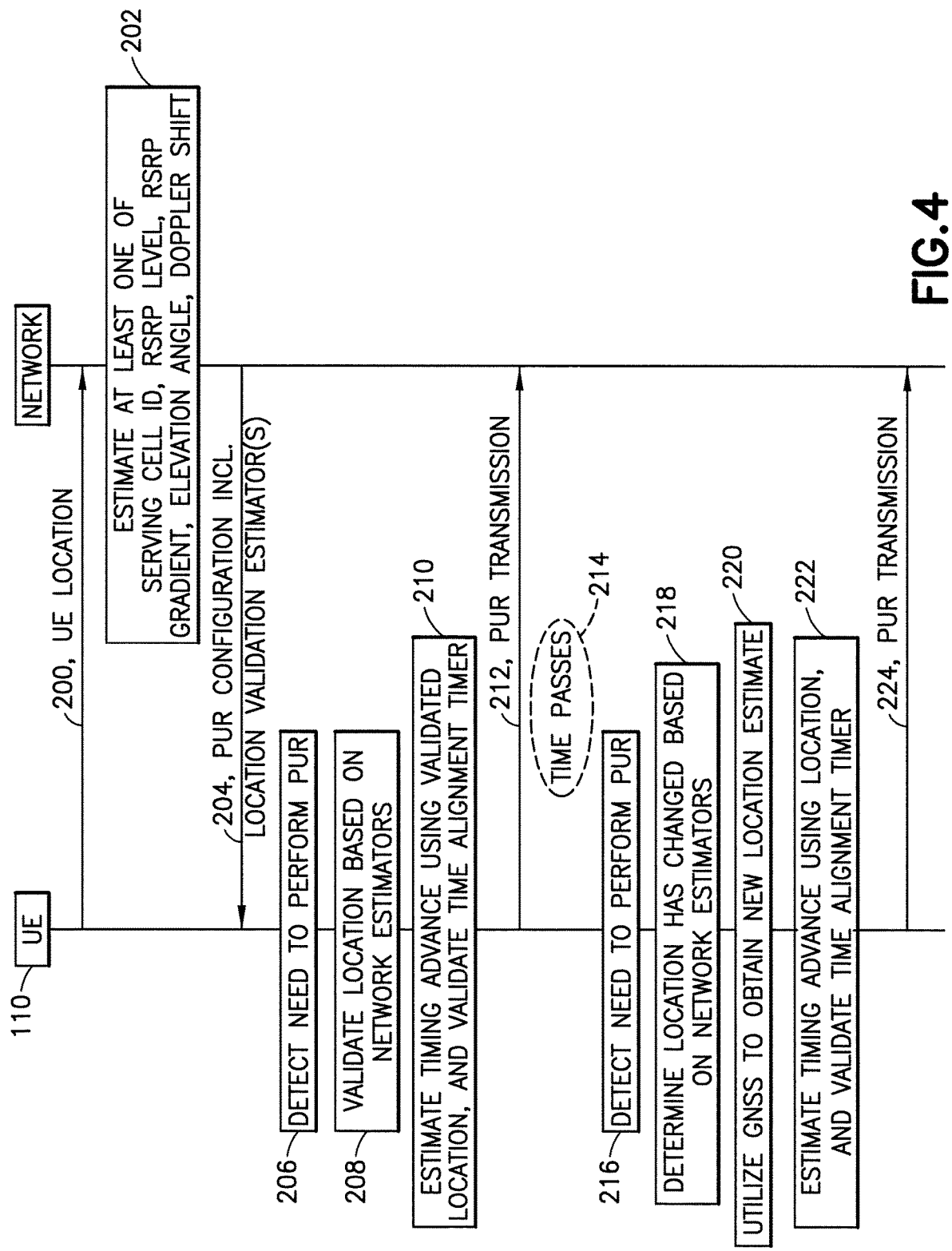
FIG. 4 is a diagram illustrating an example of location use in regard to a preconfigured uplink resources transmission between a user equipment and a network.

FIG. 4 is a schematic signaling diagram between the UE and the network of one example of the validation of the UE location based on the network estimators; validation of location prior to PUR transmission. As indicated by 200 the UE may signal its location to the network and, as indicted by 202, the network may estimate at least one of the serving cell ID, RSRP level, RSRP gradient, elevation angle and/or Doppler shift. The network, as indicated by 204, may signal to the UE the PUR configuration including location validation estimator(s). The transmission 204 may comprise multiple PUR configurations as further described below such as, for example, shown by 600, 700 and 800 in FIG. 6-8 respectively. The UE may then detect or determine whether or not to perform PUR as indicated by 206. If the UE determines to perform PUR, the UE may then validate the location based upon the network estimator(s) as indicated by 208, and estimate the Timing Advance (TA) using validation location and validate time alignment timer as indicated by 210. The UE may then signal 212 the network by sending the PUR transmission. After a period of time as indicated by 214, the UE may then detect or determine whether or not to perform PUR again as indicated by 216, determine if the UE location has changed based on the network estimator(s) as indicated by 218, utilize GNSS to obtain a new location estimate as indicated by 220, and estimate the Timing Advance (TA) again using validation location and validate time alignment timer as indicated by 222. The UE may then signal the network again by sending the PUR transmission as indicated by 224.

Figure 5:
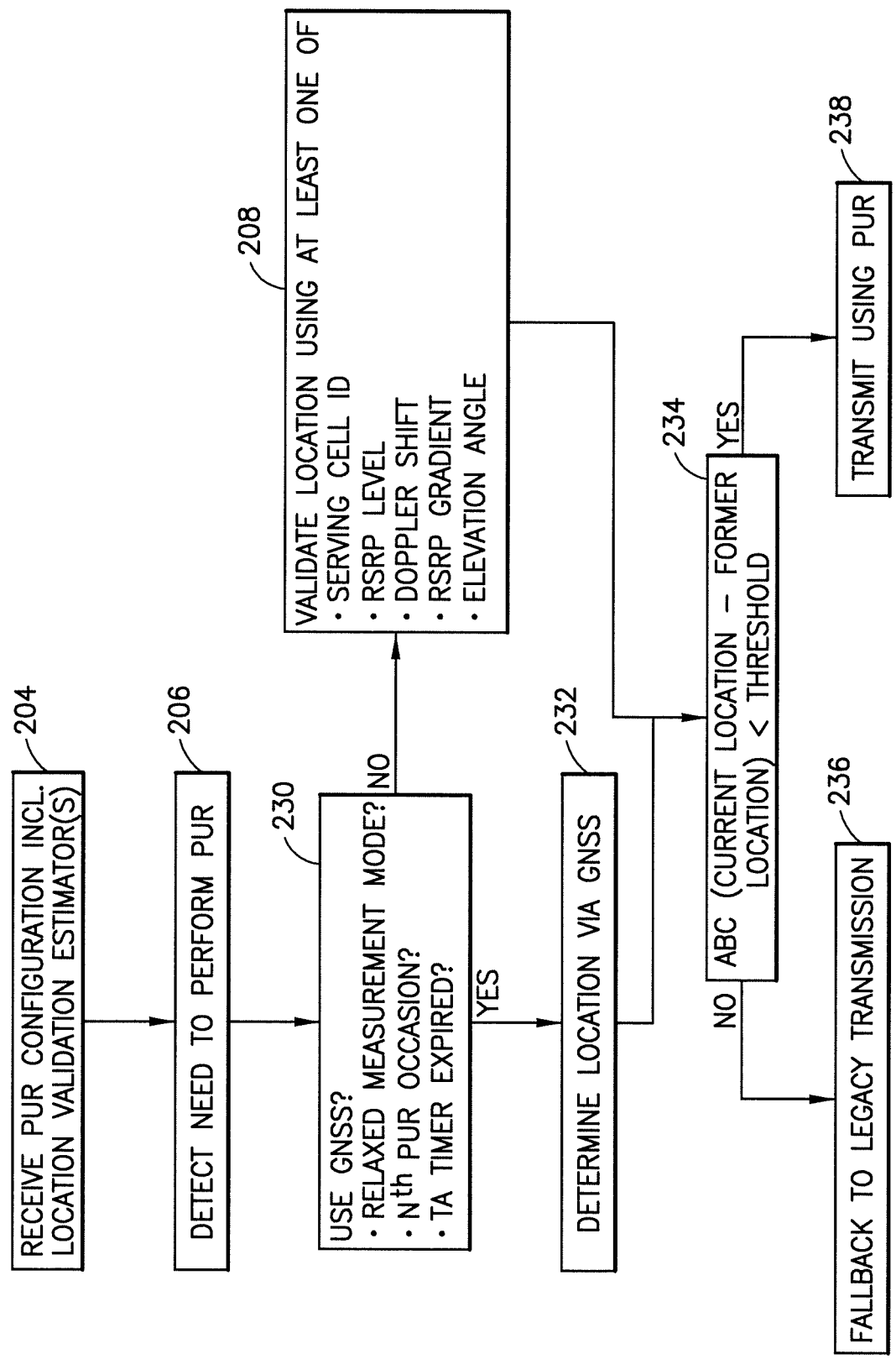
FIG. 5 is a diagram illustrating an example method for determining whether to use a preconfigured uplink resources transmission.

FIG. 5 is a flow chart of one example for the UE, defining how to decide whether or not to use a PUR transmission. The UE may receive the PUR configuration including location validation estimator(s) as indicated by 204, and then detect or determine whether or not to perform PUR as indicated by 206. If the UE determines to perform PUR, the UE may then determine whether or not to use GNSS, such as because of a related measurement mode, or a $N^{th}$ PUR occasion or a TA timer expiration for example as indicated at 230. If the UE determines to perform PUR, and if the UE determines not to use GNSS, the method may proceed to 208 where the UE may validate the location based upon the network estimator(s), such as one or more of the serving cell ID, RSRP level, RSRP gradient, elevation angle and/or Doppler shift. If the UE determines to perform PUR, and if the UE determines to use GNSS, the method may proceed to 232 where the UE may determine the location of the UE via GNSS. After the method steps of 208 or 232, the method may proceed to 234 where a determination is made whether or not the absolute value of the current location relative to the former location is less than a threshold value or setting. If the absolute value is not less than the threshold, the method may fallback to use a legacy type of transmission as indicated by 236. If the absolute value is less than the threshold, the method may transmit the PUR as indicated by 238.

After successful PUR validation, adjustments to PUR transmission may be needed due to fast satellite mobility. Some methods for PUR adaptation are disclosed as described below.

Due to fast satellite movement, the RSRP of the serving cell may have changed significantly since last PUR occasion. According to current specification this could result in the UE determining the time alignment is invalid (since RSRP exceeds the increase/decrease thresholds) and, thus, not use PUR. Furthermore, if 3GPP agrees to support use of PUR after cell reselection, the RSRP of the new cell may also be significantly different than the RSRP of the former serving cell even if the UE has not moved. The following description is illustrative of some methods which may be used to address the changing RSRP.

During initial PUR configuration, the network may configure multiple PUR options to the UE. For example, the multiple PUR options may include PUR-config1 and PUR-config2 with different MCS, number of repetitions, number of resource units, and number of PRBs. Each PUR-config may have separate RSRP thresholds such that PUR-config1 is used in one range of RSRPs and PUR-config2 is used in another range of RSRPs for example. Likewise, TA validation criteria may be defined separately. Each PUR-config may indicate which cell IDs it is valid for.

The network may inform the UE which PUR configuration(s) to use in the next cell(s). Network equipment may inform a user equipment which preconfigured uplink resource configuration to use for a next cell or a next transmission occasion. This may include the case where the network tells the UE which PUR configuration to use in the next PUR occasion (which could be a same cell or a different cell, and not necessarily the next cell). Currently a base station (BS), such as a gNB for example, and a core network (CN) are separated. However, in the future, at least some core network functionality may be located or co-located at the base station. "Network equipment" as used herein may be an entity which contains at least one function of both the BS and the core network, or may comprise multiple entities. The BS and the core network may reside within one entity or separately in different entities; and a "satellite assisted network" may refer to a BS only, or a core network only, or both a BS and a core network, such as with a distributed system having functionalities in multiple entities for example.

The network informing the UE which PUR configuration(s) to use in the next cell(s) may be based on resource utilization in the network, but may also take into account UE location. Based on estimated PUR periodicity, the network may estimate that the elevation angle will be low towards the next serving cell 1 (i.e. low RSRP, use PUR-config1), and subsequently that the elevation angle will be high for the next serving cell 2 (i.e. high RSRP, use PUR-config2). Similarly, the network may estimate and configure which PUR-config the UE shall apply at the next PUR occasion(s) of the current serving cell based on the UE location and satellite ephemeris. Thus, each PUR configuration may have an associated validity time, such as, for example, PUR-config1 is valid for time 0 to time 1, while PUR-config2 is valid for time 2 to time 3. This scenario may be valid for an earth-fixed cell with coverage time in the order of minutes for example. In regard to a satellite and its location, location related information may comprise information based upon one or more satellite location(s). The location related information, perhaps also referred to as satellite based information, relates to the network's estimate of various parameters, which depend at least on the UE's location and the satellite's location. The information may include the next cell ID for the UE estimated by network for example. The location related information may also take into account the location of the base station and/or non-terrestrial network (NTN) gateway. The NTN gateway may facilitate the feeder link connection between earth-based equipment and the satellite. This may be because, for transparent satellites, the signal may be routed back to Earth and not processed at the satellite. Thus, at least some of the location related information may depend on the UE-satellite-gateway/BS path, and not just the UE-satellite.

Alternatively, the network may indicate what PUR configurations are supported by the serving cell in a system information broadcast. For example, 2 bits may indicate 00=no PUR, 01=PUR-config1, 10=PUR-config2, and 11=PUR-config1 and PUR-config2. The NTN-specific system information block (SIB) may be defined in 3GPP. The UE may read the NTN SIB during the cell reselection and, therefore, be aware of the applicable PUR configuration(s).

Alternatively, the network may indicate which of the preconfigured PUR configuration(s) to use in the next PUR occasion(s) by use of additional bits in the DCI ACK, which the UE receives as part of the current PUR transmission (see FIG. 3).

Alternately, the network may configure an adjustment in the timing of PUR occasions (such as, for example, when the UE will transmit using PUR) such that the PUR occasions will occur at approximately a same orbital position for all satellites. With this type of example, RSRP may be similar for each PUR occasion, and there would be no need to adjust PUR resource configurations. This can be done as follows:

Adjusting each PUR occasion based on cell-specific timing offset.
   Since PUR has periodicity T while the RSRP has approximate periodicity K due to predetermined satellite movement, the timing difference may be determined and then adjusted. This may ensure PUR occasion occurs at approximately the same orbital position for all satellites. The offset may be the same for all UEs. The gNB may broadcast this cell-specific timing offset or the UE may determine it based on satellite ephemeris. The timing may include a window of opportunity where the UE can transmit using PUR.
The network may define multiple PUR occasions per satellite/cell, such as, for example, occasions corresponding to elevation angles of 60, 90 and 120 degrees. This is, for example, useful when a single satellite includes multiple cells (such as 7, 19, >100 for example).
Alternately, PUR periodicity may be defined to be the same as satellite changeover periodicity; then the PUR occasions can be configured based on this period.

Figure 6:
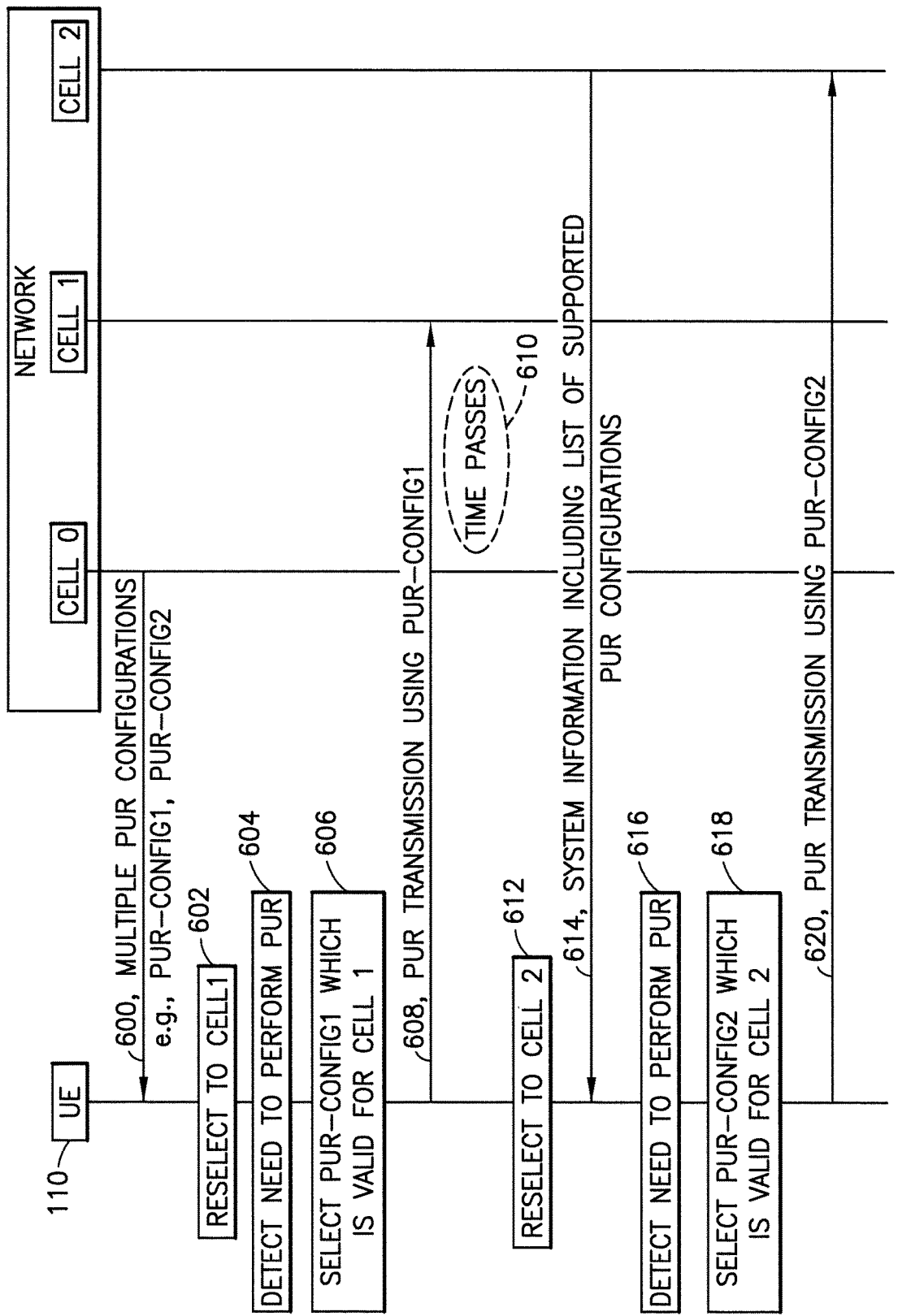
FIG. 6 is a diagram illustrating example methods for selection of a preconfigured uplink resources transmission.

FIG. 6 shows an example of signaling flow when the PUR configuration is done according to cell ID, where the UE 110 selects the PUR configuration and corresponding parameters according to the cell which is currently its serving cell. FIG. 6 shows two scenarios of selecting PUR configuration based upon cell ID. In this example, for Cell 1 the PUR-config1 may be selected based on the fact that PUR-config1 indicates Cell 1 as part of the configuration, while for Cell 2 the PUR-config2 may be selected because the system information indicates PUR-config2 is valid for Cell 2.

As shown in this example in FIG. 6, the UE 110 may receive multiple PUR configurations from the Network, such as PUR-config1 and PUR-config2 from Cell 0 for example as illustrated by 600. The UE 110 may then reselect another cell, such as Cell 1 in this example, as indicated by 602, detect whether or not to perform PUR as indicated by 604. If the UE determines to perform PUR, the UE may then select a PUR-config which is valid for the selected cell, such as PUR-config1 valid of setting for Cell 1 in this example as indicated by 606, and cause a PUR transmission using the selected PUR-config (PUR-config1 in this example) to the selected cell (Cell 1 in this example) as indicated by 608. After a passage of time, as indicated by 610, the UE 110 may cause a reselection to another cell as indicated by 612; a reselection to Cell 2 in this example. Cell 2 may transmit system information, including a list of supported PUR configuration(s) to the UE as indicated by 614. The UE 110 may then detect whether or not to perform PUR as indicated by 616. If the UE determines to perform PUR, the UE may then select a PUR-config (indicated in system information 614) which is valid for the selected cell, such as PUR-config2 valid for Cell 2 in this example, as indicated by 618, and cause a PUR transmission using the selected PUR-config (PUR-config2 in this example) to the other cell (Cell 2 in this example) as indicated by 620.

With features as described herein, use of PUR in NTN may be used to reduce the number of messages the UE and network have to send to complete a small data transfer. Considering the long propagation delay and high link loss, this reduces communication delay, UE energy consumption, and signaling overhead. Utilizing multiple PUR configurations enables the UE to perform PUR even though the serving cell has changed or the serving cell RSRP and other parameters have changed. This is highly relevant for NTN, where cells often change and conditions are very dynamic. Changing the periodicity of PUR to correspond to satellite movement periodicity is an alternative method to facilitate the usage of PUR and minimize UE power consumption. Note that for cell 1 the PUR-config1 is selected based on the fact that PUR-config1 indicates Cell 1 as part of the configuration, while for Cell 2 the PUR-config2 is selected because the system information indicates PUR-config2 is valid for Cell 2.

FIGS. 7-8 illustrate other example signaling diagrams for some of the embodiments noted above. Specifically, FIG. 7 describes an example of the selection of a PUR configuration based on measured RSRP, and FIG. 8 describes an example of the selection of a PUR configuration based on the validity time defined per PUR configuration.

As seen from the example shown in FIG. 7 for the selection of a PUR configuration based on measured RSRP, the UE 110 may receive the transmission 700 from the Network indicating multiple PUR configurations for the Network, such as PUR-config1 and PUR-config2 for example. The UE 110 may then determine or detect whether or not to perform PUR as indicated by 702. As indicated by 704, the Network may transmit reference signals to the UE 110. The UE may then measure RSRP and select a PUR-config, such as PUR-config1 in this example, based upon a RSRP threshold versus the measured RSRP as indicated by 706. As indicated by 708, the UE 110 may then cause a PUR transmission to the Network using the selected PUR-config; which is PUR-config1 in this example.

As seen from the example shown in FIG. 8 for the selection of a PUR configuration based on the validity time defined per PUR configuration, the Network may transmit and the UE 110 receive a signal indicating multiple PUR configurations for the Network, such as PUR-config1 and PUR-config2 for example. The UE 110 may then determine or detect whether or not to perform PUR as indicated by 802, and select a PUR-config based upon validity time; PUR-config1 in this example. Then, as indicated by 806, the UE 110 may signal the Network with the PUR transmission using the selected PUR-config; PUR-config1 in this example.

Figure 9:
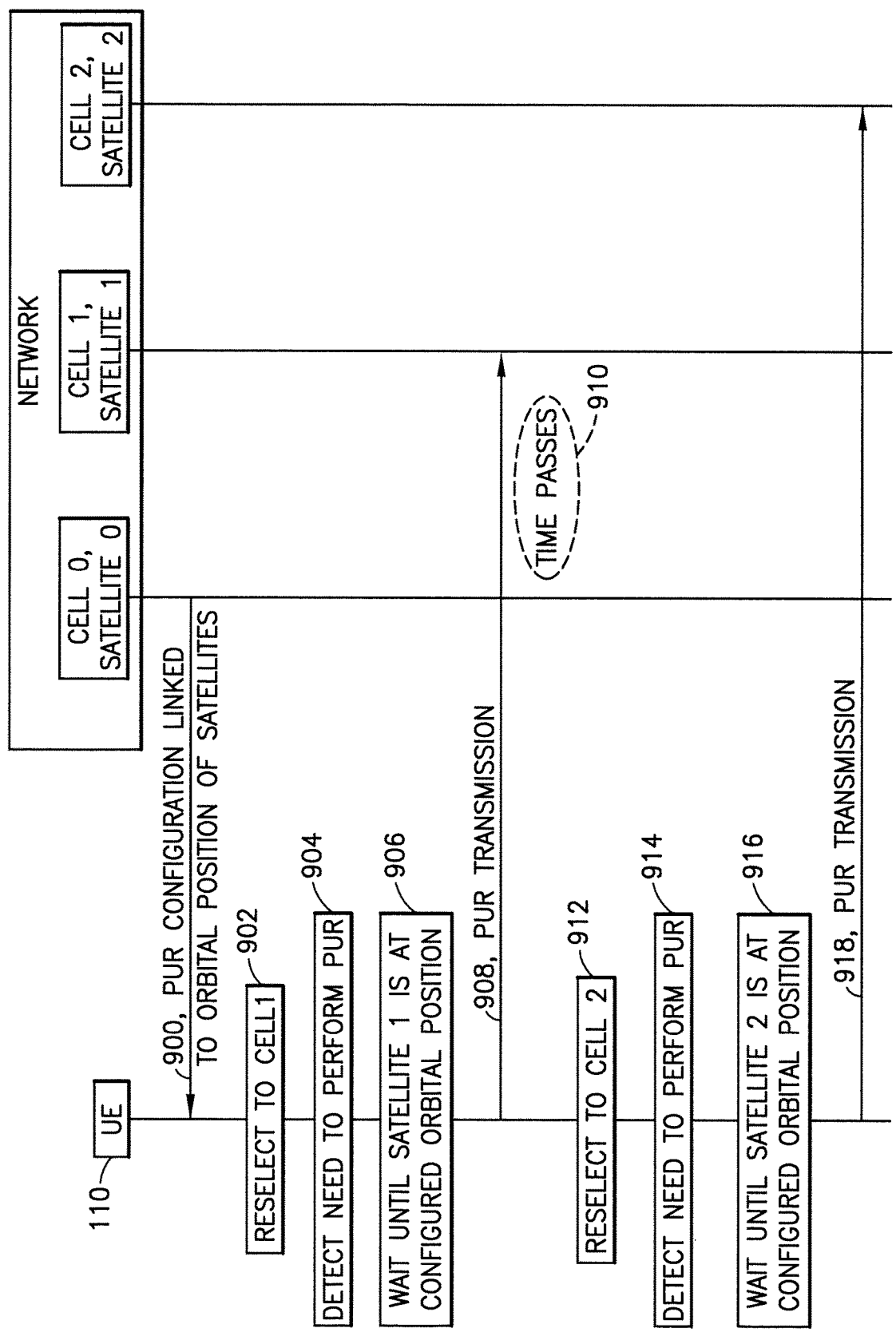
FIG. 9 is a diagram illustrating an example method for preconfigured uplink resource transmissions according to satellites' orbital positions.

FIG. 9 illustrates how the PUR configuration may be linked to satellites' orbital positions, and that the UE may align the transmission with those positions. In the example shown in FIG. 9, the UE 110 may receive a transmission from the Network, as indicated by 900, comprising PUR configuration(s) linked to orbital positions of satellites. In this example the transmission 900 is from Cell 0 which comprises satellite 0. The UE 110 may then cause a reselect to Cell 1 as indicated by 902, detect or determine whether or not to perform PUR as indicated by 904. The UE 110 may then wait for the satellite, such as satellite 1 in this example, to become located at a configured orbital position as indicated by 906, and then transmit a PUR transmission as indicated by 908 to that satellite (satellite 1 in this example). After a passage of time, as indicated by 910, the UE 110 may cause another cell to be reselected, such as Cell 2 in this example comprising satellite 2, as indicated by 914. As indicated by 916, the UE 110 may then detect or determine whether or not to perform PUR. The UE 110 may then wait until another satellite, such as satellite 2 in this example, becomes located at a configured orbital position as indicated by 916, and then transmit a PUR transmission as indicated by 918 to that satellite (satellite 2 in this example).

In case the network supports multiple PUR configurations, the receiver may have to blindly detect which configuration the UE has applied. For example, two PUR configurations may use different MCS and, thus, the network may have to attempt to decode both. Given that the network has an estimate of which PUR configuration the UE has applied, it may perform a sequential decoding, using the estimated PUR configuration first and, if that fails, attempt decoding with other configuration(s).

Figure 10:
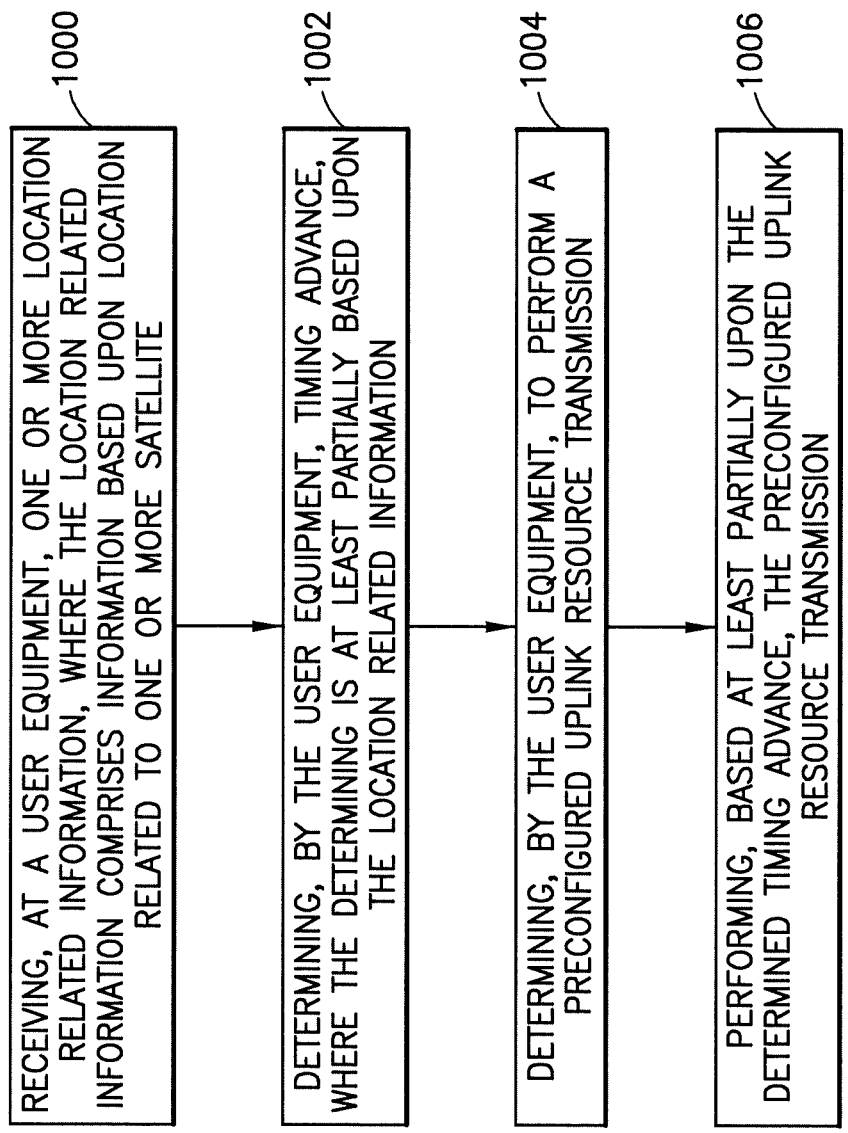
FIG. 10 is a diagram illustrating an example method.

Referring also to FIG. 10, in accordance with one example, an example method may be provided comprising: receiving as indicated by block 1000, at a user equipment, one or more location related information, where the location related information comprises information based upon location related to one or more satellite; determining as indicated by block 1002, by the user equipment, timing advance, where the determining is at least partially based upon the location related information; determining as indicated by block 1004, by the user equipment, to perform (or a need to perform) a preconfigured uplink resource transmission; and performing as indicated by block 1006, based at least partially upon the determined timing advance, the preconfigured uplink resource transmission.

The receiving of the one or more location related information may comprise receiving the location related information as part of at least one preconfigured uplink resource configuration. The one or more location related information may comprise at least one of: a serving cell ID information, reference signal received power level information, reference signal received power gradient information, elevation angle information, or Doppler shift information. In regard to reference signal received power level information, this may be a range of values, which the UE can then compare a recent measurement with. The method may further comprise validating, by the user equipment, location of the user equipment based upon at least one of the received one or more location related information. The determining of the timing advance may comprise using the validated location of the user equipment and a valid time alignment timer. The method may further comprise determining a change in location of the user equipment based at least partially upon at least one of the received one or more location related information. The method may further comprise using global navigation system information, by the user equipment, to obtain a new location determination of the user equipment. The method may further comprise: determining, by the user equipment, to: use at least one of global navigation satellite system information to determine a location of the user equipment, or positioning assistance data to determine a location of the user equipment. Positioning assistance data might be 5G data or WiFi based assistance data for example. The 5G data may be, for example, DL-TDOA assistance data or any other suitable 5G positioning technique. The method may further comprise: comparing distance regarding the location of the user equipment to a distance threshold; and determining, by the user equipment, based upon the comparing, to: perform the preconfigured uplink resource transmission, or transmit a physical random access channel signal. The distance threshold may be configured based upon an acceptable timing advance threshold or a cyclic prefix length.

In accordance with an example embodiment, an apparatus may be provided comprising: at least one processor; and at least one non-transitory memory including computer program code, the at least one memory and the computer program code configured to, with the at least one processor, cause the apparatus to: receive, at the apparatus, one or more location related information, where the location related information comprises information based upon location related to one or more satellite; determine, by the apparatus, timing advance, where the determining is at least partially based upon the location related information; determine, by the apparatus, to perform (or a need to perform) a preconfigured uplink resource transmission; and perform, based at least partially upon the determined timing advance, the preconfigured uplink resource transmission.

The apparatus may be configured such that the receiving of the one or more location related information comprises the apparatus being configured to receive the location related information as part of at least one preconfigured uplink resource configuration. The one or more location related information may comprise at least one of: a serving cell ID information, reference signal received power level information, reference signal received power gradient information, elevation angle information, or Doppler shift information. The apparatus may be further configured to validate location of the apparatus based upon at least one of the received one or more location related information. The apparatus may be configured such that the determining of the timing advance comprises the apparatus being configured to use the validated location of the apparatus and a valid time alignment timer. The apparatus may be further configured to determine a change in location of the apparatus based at least partially upon at least one of the received one or more location related information. The apparatus may be further configured to use global navigation system information to obtain a new location determination of the apparatus. The apparatus may be further configured to: determine to use at least one of: global navigation satellite system information to determine a location of the apparatus, or positioning assistance data to determine the location of the apparatus. The apparatus may be further configured to: compare distance regarding the location of the apparatus to a distance threshold; and determining, based upon the comparing, to: perform the preconfigured uplink resource transmission, or transmit a physical random access channel signal. The distance threshold may be configured based upon an acceptable timing advance threshold or a cyclic prefix length.

In accordance with an example embodiment, an apparatus may be provided comprising a non-transitory program storage device readable by a machine, tangibly embodying a program of instructions executable by the machine for performing operations, the operations comprising: receiving, at a user equipment, one or more location related information, where the location related information comprises information based upon location related to one or more satellite; determining, by the user equipment, timing advance, where the determining is at least partially based upon the location related information; determining, by the user equipment, to perform (or a need to perform) a preconfigured uplink resource transmission; and performing, based at least partially upon the determined timing advance, the preconfigured uplink resource transmission.

In accordance with an example embodiment, an apparatus may be provided comprising: means for receiving, at a user equipment, one or more location related information, where the location related information comprises information based upon location related to one or more satellite; means for determining, by the user equipment, timing advance, where the determining is at least partially based upon the location related information; means for determining, by the user equipment, to perform (or a need to perform) a preconfigured uplink resource transmission; and means for performing, based at least partially upon the determined timing advance, the preconfigured uplink resource transmission.

In accordance with an example embodiment, an apparatus may be provided comprising circuitry configured for receiving, at a user equipment, one or more location related information, where the location related information comprises information based upon location related to one or more satellite; circuitry configured for determining, by the user equipment, timing advance, where the determining is at least partially based upon the location related information; circuitry configured for determining, by the user equipment, to perform (or a need to perform) a preconfigured uplink resource transmission; and circuitry configured for performing, based at least partially upon the determined timing advance, the preconfigured uplink resource transmission.

Figure 11:
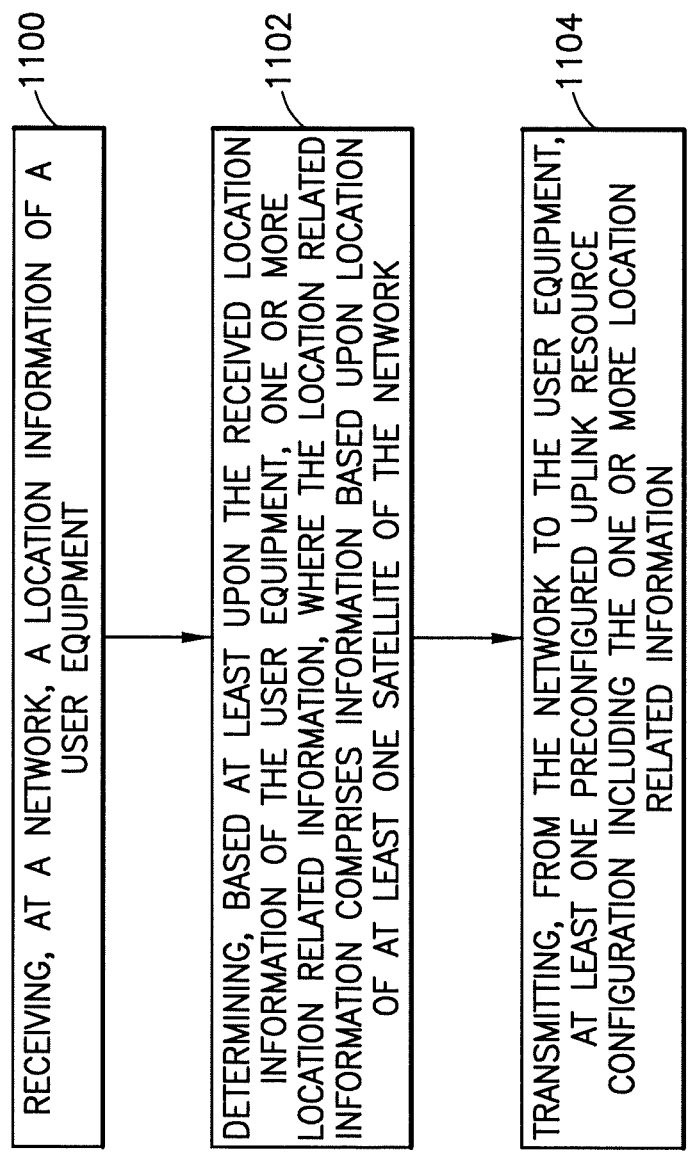
FIG. 11 is a diagram illustrating an example method.

Referring also to FIG. 11, in accordance with another example, an example method may be provided comprising: receiving as indicated by block 1100, by a network, a location information of a user equipment; determining as indicated by block 1102, based at least upon the received location information of the user equipment, one or more location related information, where the location related information comprises information based upon location of at least one satellite of the network; and transmitting as indicated by block 1104, from the network to the user equipment, at least one preconfigured uplink resource configuration including the one or more location related information. As used herein, the word "determining" may also comprise estimating. For example, determining, based at least upon the received location information of the user equipment, one or more location related information, may comprise estimating, based at least upon the received location information of the user equipment, one or more location related information.

The one or more location related information may comprise at least one of: serving cell ID information, reference signal received power level information, reference signal received power gradient information, elevation angle information, or Doppler shift information.

In accordance with an example embodiment, an apparatus may be provided comprising: at least one processor; and at least one non-transitory memory including computer program code, the at least one memory and the computer program code configured to, with the at least one processor, cause the apparatus to: receive, by the apparatus, a location information of a user equipment; determine, based at least upon the received location information of the user equipment, one or more location related information, where the location related information comprises information based upon location of at least one satellite of the network; and transmit, from the network to the user equipment, at least one preconfigured uplink resource configuration including the one or more location related information. The one or more location related information may comprise at least one of: serving cell ID information, reference signal received power level information, reference signal received power gradient information, elevation angle information, or Doppler shift information.

In accordance with an example embodiment, an apparatus may be provided comprising a non-transitory program storage device readable by a machine, tangibly embodying a program of instructions executable by the machine for performing operations, the operations comprising: receiving, by a network, a location information of a user equipment; determining, based at least upon the received location information of the user equipment, one or more location related information, where the location related information comprises information based upon location of at least one satellite of the network; and transmitting, from the network to the user equipment, at least one preconfigured uplink resource configuration including the one or more location related information.

In accordance with an example embodiment, an apparatus may be provided comprising means for receiving, by a network, a location information of a user equipment; means for determining, based at least upon the received location information of the user equipment, one or more location related information, where the location related information comprises information based upon location of at least one satellite of the network; and means for transmitting, from the network to the user equipment, at least one preconfigured uplink resource configuration including the one or more location related information.

In accordance with an example embodiment, an apparatus may be provided comprising circuitry configured for receiving, by a network, a location information of a user equipment; circuitry configured for determining, based at least upon the received location information of the user equipment, one or more location related information, where the location related information comprises information based upon location of at least one satellite of the network; and circuitry configured for transmitting, from the network to the user equipment, at least one preconfigured uplink resource configuration including the one or more location related information.

Figure 12:
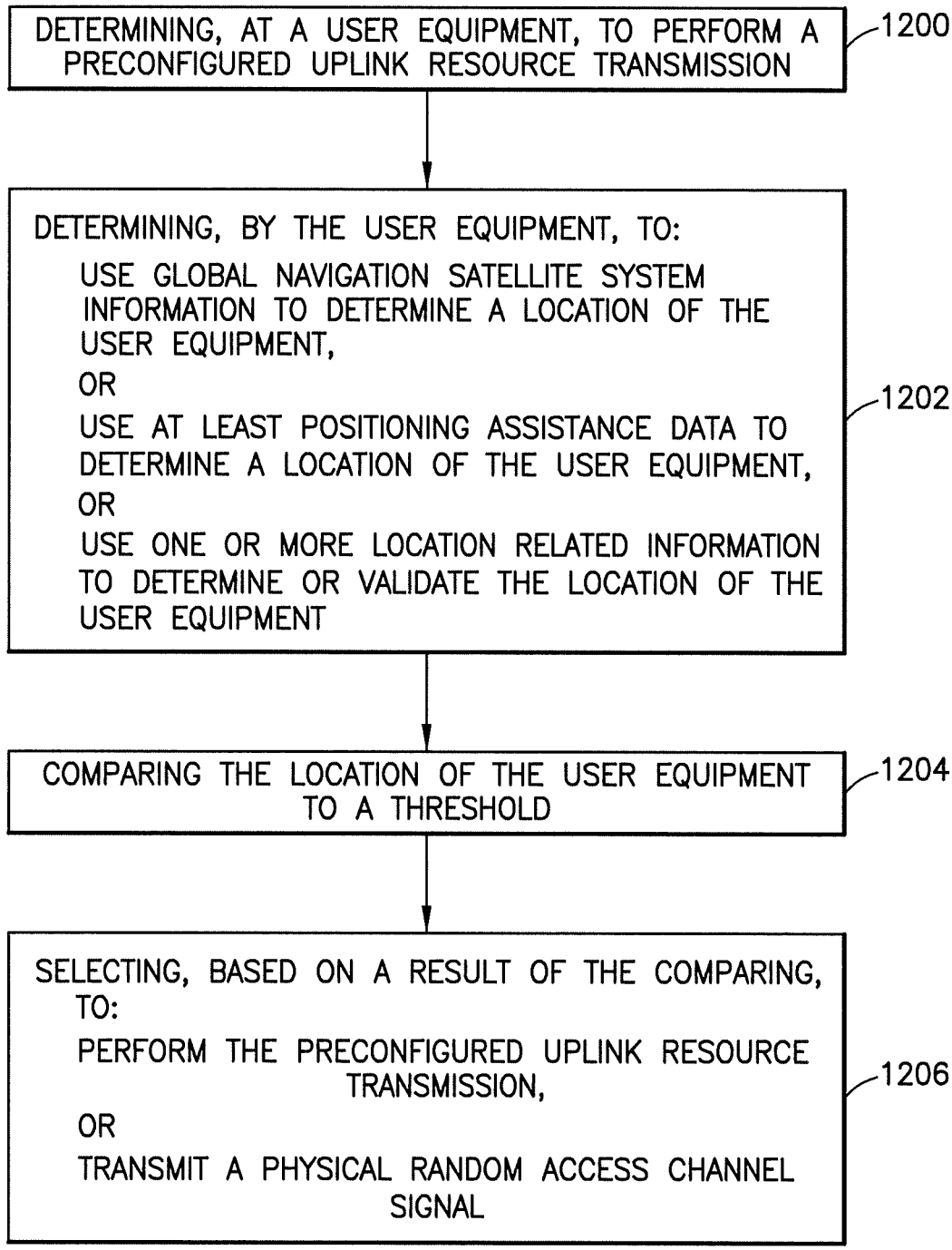
FIG. 12 is a diagram illustrating an example method.

Referring also to FIG. 12, in accordance with another example, an example method may be provided comprising: determining as indicated by block 1200, at a user equipment, to perform (or a need to perform) a preconfigured uplink resource transmission; determining as indicated by block 1202, by the user equipment, to: use global navigation satellite system information to determine a location of the user equipment, or use at least positioning assistance data to determine a location of the user equipment, or use one or more location related information to determine or validate the location of the user equipment; comparing as indicated by block 1204 the location of the user equipment to a threshold; and selecting as indicated by block 1206, as a result of the comparing, to: perform a preconfigured uplink resource transmission, or transmit a physical random access channel signal.

The determining to use the global navigation satellite system information to determine a location of the user equipment may comprise using at least one of: a relaxed measurement mode, a Nth preconfigured uplink resource occasion, or a timing advance expiration. The one or more location related information may comprise at least one of: serving cell ID information, reference signal received power level information, reference signal received power gradient information, elevation angle information, or Doppler shift information. The comparing may comprise comparing an absolute value of a current location of the user equipment versus a former location of the user equipment to the threshold.

In accordance with an example embodiment, an apparatus may be provided comprising: at least one processor; and at least one non-transitory memory including computer program code, the at least one memory and the computer program code configured to, with the at least one processor, cause the apparatus to: determine to perform a preconfigured uplink resource transmission; determine to: use global navigation satellite system information to determine a location of a user equipment, or use at least positioning assistance data to determine the location of the user equipment, or use one or more location related information to determine or validate the location of the user equipment; compare the location of the user equipment to a threshold; and selecting, as a result of the comparing, to: perform a preconfigured uplink resource transmission, or transmit a physical random access channel signal.

The apparatus may be configured to use at least one of: a relaxed measurement mode, a Nth preconfigured uplink resource occasion, or a timing advance expiration. The one or more location related information may comprise at least one of: serving cell ID information, reference signal received power level information, reference signal received power gradient information, elevation angle information, or Doppler shift information. The apparatus may be configured to compare an absolute value of a current location of the user equipment versus a former location of the user equipment to the threshold.

In accordance with an example embodiment, an apparatus may be provided comprising non-transitory program storage device readable by a machine, tangibly embodying a program of instructions executable by the machine for performing operations, the operations comprising: determining, at a user equipment, to perform a preconfigured uplink resource transmission; determining, by the user equipment, to: use global navigation satellite system information to determine a location of the user equipment, or use at least positioning assistance data to determine a location of the user equipment, or use one or more location related information to determine or validate the location of the user equipment; comparing the location of the user equipment to a threshold; and selecting, as a result of the comparing, to: perform a preconfigured uplink resource transmission, or transmit a physical random access channel signal.

In accordance with an example embodiment, an apparatus may be provided comprising means for determining, at a user equipment, to perform a preconfigured uplink resource transmission; determining, by the user equipment, to: use global navigation satellite system information to determine a location of the user equipment, or use at least positioning assistance data to determine a location of the user equipment, or use one or more location related information to determine or validate the location of the user equipment; means for comparing the location of the user equipment to a threshold; and means for selecting, as a result of the comparing, to: perform a preconfigured uplink resource transmission, or transmit a physical random access channel signal.

In accordance with an example embodiment, an apparatus may be provided comprising circuitry configured for determining, at a user equipment, to perform a preconfigured uplink resource transmission; circuitry configured for determining, by the user equipment, to: use global navigation satellite system information to determine a location of the user equipment, or use at least positioning assistance data to determine a location of the user equipment, or use one or more location related information to determine or validate the location of the user equipment; circuitry configured for comparing the location of the user equipment to a threshold; and circuitry configured for selecting, as a result of the comparing, to: perform a preconfigured uplink resource transmission, or transmit a physical random access channel signal.

In accordance with an example embodiment, an apparatus may be provided comprising means for determining, at a user equipment, to perform a preconfigured uplink resource transmission; determining, by the user equipment, to: use global navigation satellite system information to determine a location of the user equipment, or use at least positioning assistance data to determine a location of the user equipment, or use one or more location related information to determine or validate the location of the user equipment; means for comparing the location of the user equipment to a threshold; and means for selecting, as a result of the comparing, to: perform a preconfigured uplink resource transmission, or transmit a physical random access channel signal.

In accordance with an example embodiment, an apparatus may be provided comprising circuitry configured for determining, at a user equipment, to perform a preconfigured uplink resource transmission; circuitry configured for determining, by the user equipment, to: use global navigation satellite system information to determine a location of the user equipment, or use at least positioning assistance data to determine a location of the user equipment, or use one or more location related information to determine or validate the location of the user equipment; circuitry configured for comparing the location of the user equipment to a threshold; and circuitry configured for selecting, as a result of the comparing, to: perform a preconfigured uplink resource transmission, or transmit a physical random access channel signal.

Figure 13:
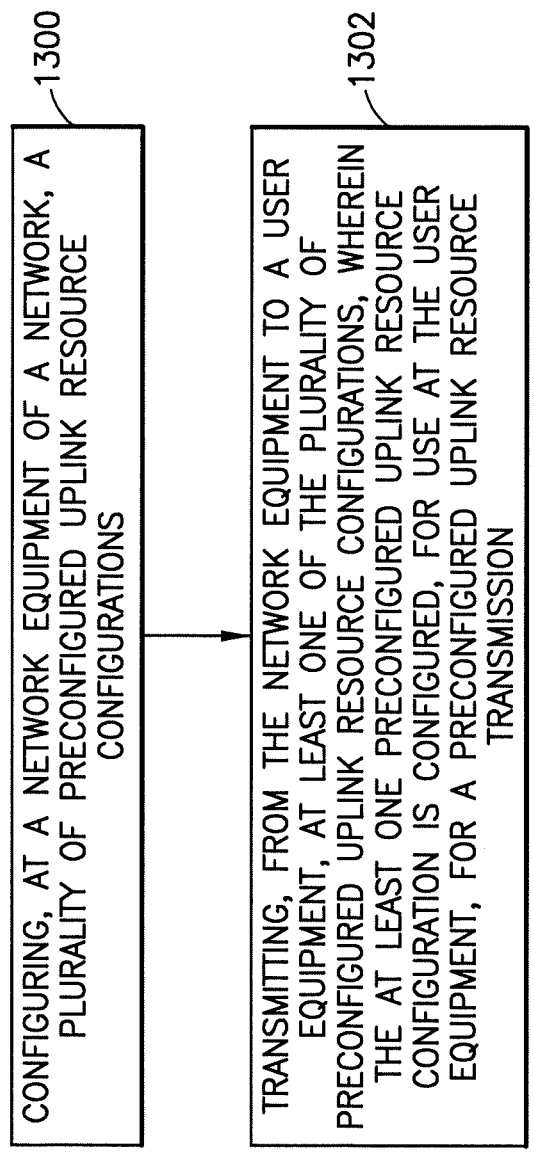
FIG. 13 is a diagram illustrating an example method.

Referring also to FIG. 13, in accordance with another example, an example method may be provided comprising: configuring as indicated by block 1300, at a network equipment of a network, a plurality of preconfigured uplink resource configurations; and transmitting as indicated by block 1302, from the network equipment to a user equipment, at least one of the plurality of preconfigured uplink resource configurations, wherein the at least one preconfigured uplink resource configuration is configured, to be used at the user equipment, for a preconfigured uplink resource transmission. With features as described herein, an example method may comprise configuring, at a network equipment of a network, a plurality of preconfigured uplink resource configurations; not merely one preconfigured uplink resource configuration. The network could configure the plurality of preconfigured uplink resource configurations for multiple different user equipments. This is different from a user equipment which would only get one PUR configuration.

The transmitting at least one of the plurality of preconfigured uplink resource configurations may comprise transmitting the plurality of preconfigured uplink resource configurations to the user equipment by a single transmission. The network equipment may indicate to the user equipment which of the plurality of preconfigured uplink resource configurations are supported by a satellite or cell. The method may further comprise configuring, by the network equipment, an adjustment in timing for preconfigured uplink resource transmission occasions for the user equipment such that the preconfigured uplink resource transmission occasions will occur at approximately a same orbital position for multiple satellites of the network. The method may further comprise adjusting a preconfigured uplink resource transmission occasion based on a cell-specific timing offset. The method may further comprise the network equipment informing the user equipment which preconfigured uplink resource configuration to use for a next cell or next transmission occasion. The network equipment informing the user equipment which preconfigured uplink resource configuration to use for a next cell may comprise use of additional bits in a downlink control information acknowledgement signal. A first one of the plurality of preconfigured uplink resource configurations may comprise at least one of: modulation and coding scheme, a number of repetitions, a number of resource units, a number of physical resource blocks, a reference signal received power threshold, or an indication of which Cell ID which the configuration is valid for. The first preconfigured uplink resource configurations comprises at least one of: a different modulation and coding scheme, different number of repetitions, different number of resource units, different number of physical resource blocks, a separate reference signal received power threshold, or a different indication of which Cell ID which the configuration is valid for, versus a second one of the plurality of preconfigured uplink resource configurations. The network equipment may indicate to the user equipment which of the plurality of preconfigured uplink resource configurations to use, based upon at least one of: resource utilization in the network taking into account location of the user equipment, determined preconfigured uplink resource periodicity, elevation angle, the user equipment location and satellite ephemeris, or a preconfigured uplink resource configuration associated validity time. The indication to the user equipment which of the plurality of preconfigured uplink resource configurations are supported by a satellite may be contained in a system information broadcast. The preconfigured uplink resource may have a periodicity T, and wherein a reference signal received power has an approximate periodicity K due to predetermined satellite movement, and a timing difference between T and K is determined and then adjusted.

In accordance with an example embodiment, an apparatus may be provided comprising: at least one processor; and at least one non-transitory memory including computer program code, the at least one memory and the computer program code configured to, with the at least one processor, cause the apparatus to: configure, at a network equipment of a network, a plurality of preconfigured uplink resource configurations; and transmit, from the network equipment to a user equipment, at least one of the plurality of preconfigured uplink resource configurations, wherein the at least one preconfigured uplink resource configuration is configured, to be used at the user equipment, for a preconfigured uplink resource transmission.

For the transmitting at least one of the plurality of preconfigured uplink resource configurations, the apparatus may be configured to transmit the plurality of preconfigured uplink resource configurations to the user equipment by a single transmission. The apparatus may be configured to indicates to the user equipment which of the plurality of preconfigured uplink resource configurations are supported by a satellite or cell. The apparatus may be further configured to configure an adjustment in timing for preconfigured uplink resource transmission occasions for the user equipment such that the preconfigured uplink resource transmission occasions will occur at approximately a same orbital position for multiple satellites of the network. The apparatus may be further configured to adjust a preconfigured uplink resource transmission occasion based on a cell-specific timing offset. The apparatus may be further configured to cause the network equipment to inform the user equipment which preconfigured uplink resource configuration to use for a next cell or next transmission occasion. The apparatus may be further configured to cause the network equipment to inform the user equipment which preconfigured uplink resource configuration to use for a next cell comprises use of additional bits in a downlink control information acknowledgement signal. A first one of the plurality of preconfigured uplink resource configurations may comprise at least one of: modulation and coding scheme, a number of repetitions, a number of resource units, a number of physical resource blocks, a reference signal received power threshold, or an indication of which Cell ID which the configuration is valid for. The first preconfigured uplink resource configurations comprises at least one of: a different modulation and coding scheme, different number of repetitions, different number of resource units, different number of physical resource blocks, a separate reference signal received power threshold, or a different indication of which Cell ID which the configuration is valid for, versus a second one of the plurality of preconfigured uplink resource configurations. The apparatus may be configured to cause the network equipment to indicate to the user equipment which of the plurality of preconfigured uplink resource configurations to use, based upon at least one of: resource utilization in the network taking into account location of the user equipment, determined preconfigured uplink resource periodicity, elevation angle, the user equipment location and satellite ephemeris, or a preconfigured uplink resource configuration associated validity time. The indication to the user equipment may be of which of the plurality of preconfigured uplink resource configurations are supported by a satellite is contained in a system information broadcast. The preconfigured uplink resource may have a periodicity T, and wherein a reference signal received power has an approximate periodicity K due to predetermined satellite movement, and a timing difference between T and K is determined and then adjusted.

In accordance with an example embodiment, an apparatus may be provided comprising a non-transitory program storage device readable by a machine, tangibly embodying a program of instructions executable by the machine for performing operations, the operations comprising: configuring, at a network equipment of a network, a plurality of preconfigured uplink resource configurations; and transmitting, from the network equipment to a user equipment, at least one of the plurality of preconfigured uplink resource configurations, wherein the at least one preconfigured uplink resource configuration is configured, to be used at the user equipment, for a preconfigured uplink resource transmission.

In accordance with an example embodiment, an apparatus may be provided comprising means for configuring, at a network equipment of a network, a plurality of preconfigured uplink resource configurations; and means for transmitting, from the network equipment to a user equipment, at least one of the plurality of preconfigured uplink resource configurations, wherein the at least one preconfigured uplink resource configuration is configured, to be used at the user equipment, for a preconfigured uplink resource transmission.

In accordance with an example embodiment, an apparatus may be provided comprising circuitry configured for configuring, at a network equipment of a network, a plurality of preconfigured uplink resource configurations; and circuitry configured for transmitting, from the network equipment to a user equipment, at least one of the plurality of preconfigured uplink resource configurations, wherein the at least one preconfigured uplink resource configuration is configured, to be used at the user equipment, for a preconfigured uplink resource transmission.

Figure 14:
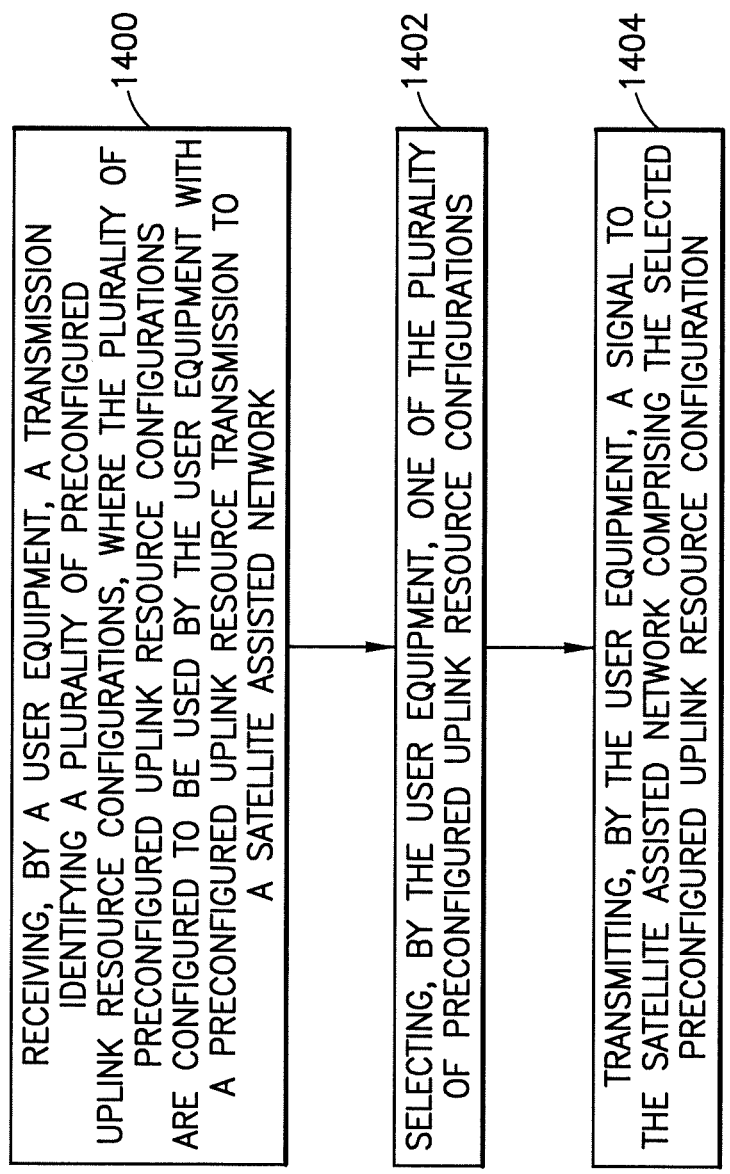
FIG. 14 is a diagram illustrating an example method.

Referring also to FIG. 14, in accordance with another example, an example method may be provided comprising: receiving as indicated by block 1400, by a user equipment, a transmission identifying a plurality of preconfigured uplink resource configurations, where the plurality of preconfigured uplink resource configurations are configured to be used by the user equipment with a preconfigured uplink resource transmission to a satellite assisted network; selecting as indicated by block 1402, by the user equipment, one of the plurality of preconfigured uplink resource configurations; and transmitting as indicated by block 1404, by the user equipment, a signal to the satellite assisted network comprising the selected preconfigured uplink resource configuration.

The selecting of the preconfigured uplink resource configuration may comprise using cell ID information. The selecting of the preconfigured uplink resource configuration may comprise using measured reference signal received power information. The selecting of the preconfigured uplink resource configuration may comprise using validity time information.

In accordance with an example embodiment, an apparatus may be provided comprising: at least one processor; and at least one non-transitory memory including computer program code, the at least one memory and the computer program code configured to, with the at least one processor, cause the apparatus to: receive, by a user equipment, a transmission identifying a plurality of preconfigured uplink resource configurations, where the plurality of preconfigured uplink resource configurations are configured to be used by the user equipment with a preconfigured uplink resource transmission to a satellite assisted network; select, by the user equipment, one of the plurality of preconfigured uplink resource configurations; and transmit, by the user equipment, a signal to the satellite assisted network comprising the selected preconfigured uplink resource configuration.

For the selecting of the preconfigured uplink resource configuration, the apparatus may be configured to use cell ID information. For the selecting of the preconfigured uplink resource configuration, the apparatus may be configured to use measured reference signal received power information. For the selecting of the preconfigured uplink resource configuration, the apparatus may be configured to use validity time information.

In accordance with an example embodiment, an apparatus may be provided comprising a non-transitory program storage device readable by a machine, tangibly embodying a program of instructions executable by the machine for performing operations, the operations comprising: receiving, by a user equipment, a transmission identifying a plurality of preconfigured uplink resource configurations, where the plurality of preconfigured uplink resource configurations are configured to be used by the user equipment with a preconfigured uplink resource transmission to a satellite assisted network; selecting, by the user equipment, one of the plurality of preconfigured uplink resource configurations; and transmitting, by the user equipment, a signal to the satellite assisted network comprising the selected preconfigured uplink resource configuration.

As noted above, a method may comprise estimating or determining, based upon the received location information of the user equipment, one or more location related information of a satellite of the network. The estimation can also take into account the timing advance threshold, cyclic prefix length, network load and network-experienced interference in uplink resources.

As noted above, an example method may comprises receiving, by a user equipment, a transmission identifying a plurality of preconfigured uplink resource configurations, where the plurality of preconfigured uplink resource configurations are configured to be used by the user equipment with a preconfigured uplink resource transmission to a satellite of a network. The configurations are linked to cells. The transmission itself is to a network element (it may be, for example, to a gNB on a satellite, or a gNB on earth where the signal is relayed through a satellite).

In regard to the determining to perform the PUR transmission, it may be triggered or initiated if there is data pending in the UE buffer. In regard to the conditions which may need to be fulfilled before the UE is allowed to perform the transmission, one condition may be that the UE determines the estimated TA is within the allowed range; the estimated TA being based on the validated location. Additional conditions, such as PUR-config1 or PUR-config2 described above based on RSRP or explicit indication from the network, or specific PUR configurations linked to specific time may be used.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a network accessible service entity, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
   (i) a combination of analogue and/or digital hardware circuit(s) with software/firmware, and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (such as, for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with another example embodiment, an example apparatus may be provided comprising means for performing: receiving one or more location related information, where the location related information comprises information based upon location related to one or more satellite; determining timing advance, where the determining is at least partially based upon the location related information; determining to perform a preconfigured uplink resource transmission; and performing, based at least partially upon the determined timing advance, the preconfigured uplink resource transmission.

In accordance with another example embodiment, an example apparatus may be provided comprising means for performing: receiving a location information of a user equipment in a network; determining, based at least upon the received location information of the user equipment, one or more location related information, where the location related information comprises information based upon location of at least one satellite of the network; and transmitting, to the user equipment, at least one preconfigured uplink resource configuration including the one or more location related information.

In accordance with another example embodiment, an example apparatus may be provided comprising means for performing: determining to perform a preconfigured uplink resource transmission; determining to: use global navigation satellite system information to determine a location of the apparatus, or use at least positioning assistance data to determine a location of the apparatus, or use one or more location related information to determine or validate the location of the apparatus; comparing the location of the apparatus to a threshold; and selecting, based on a result of the comparing, to: perform the preconfigured uplink resource transmission, or transmit a physical random access channel signal.

In accordance with another example embodiment, an example apparatus may be provided comprising means for performing: configuring a plurality of preconfigured uplink resource configurations; and transmitting, to a user equipment, at least one of the plurality of preconfigured uplink resource configurations, wherein the at least one preconfigured uplink resource configuration is configured, for use at the user equipment, for a preconfigured uplink resource transmission.

In accordance with another example embodiment, an example apparatus may be provided comprising means for performing: receiving a transmission identifying a plurality of preconfigured uplink resource configurations, where the plurality of preconfigured uplink resource configurations are configured to be used by the apparatus with a preconfigured uplink resource transmission to a satellite assisted network; selecting one of the plurality of preconfigured uplink resource configurations; and transmitting a signal to the satellite assisted network comprising the selected preconfigured uplink resource configuration.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
at least one processor; and
at least one memory storing instructions that, when executed by the at least one processor, cause the apparatus at least to:

receive one or more location related information, wherein the one or more location related information comprises serving cell identifier (ID) information and information based upon location related to one or more satellite;

determine to use at least one of:
- global navigation satellite system information to determine a location of the apparatus, or
- positioning assistance data to determine the location of the apparatus;

determine a timing advance, wherein the determining of the timing advance is at least partially based upon the one or more location related information including ephemeris information of the one or more satellite, wherein the ephemeris information used to determine the timing advance comprises an orbital position of the one or more satellite;

determine to perform a preconfigured uplink resource transmission using a preconfigured uplink resource;

wherein the preconfigured uplink resource transmission is performed based on at least one preconfigured uplink resource configuration that has an associated validity time during which the at least one preconfigured uplink resource configuration is valid for the performing of the preconfigured uplink resource transmission using the preconfigured uplink resource; and perform, based at least partially upon the determined timing advance, the preconfigured uplink resource transmission.

2. The apparatus as claimed in claim 1, wherein for the receiving of the one or more location related information, the apparatus is configured to cause receiving of the location related information as part of the at least one preconfigured uplink resource configuration.

3. The apparatus as claimed in claim 1, wherein the one or more location related information further comprises at least one of:
reference signal received power level information, or
Doppler shift information.

4. The apparatus as claimed in claim 1, wherein the at least one memory stores instructions that, when executed by the at least one processor, cause the apparatus at least to validate the location of the apparatus based upon at least one of the received one or more location related information.

5. The apparatus as claimed in claim 4, wherein for the determining of the timing advance, the apparatus is configured to cause use of the validated location of the apparatus and a valid time alignment timer.

6. The apparatus as claimed in claim 1, wherein the at least one memory stores instructions that, when executed by the at least one processor, cause the apparatus at least to determine a change in location of the apparatus based at least partially upon at least one of the received one or more location related information.

7. The apparatus as claimed in claim 6, wherein the at least one memory stores instructions that, when executed by the at least one processor, cause the apparatus at least to use global navigation system information to obtain a new location determination of the apparatus.

8. The apparatus of claim 1, wherein the instructions, when executed by the at least one processor, cause the apparatus at least to:
receive, from a network, the at least one preconfigured uplink resource configuration.

9. The apparatus of claim 1, wherein the instructions, when executed by the at least one processor, cause the apparatus at least to:
compare distance regarding the location of the apparatus to a distance threshold; and
determine, based upon the comparing, to perform the preconfigured uplink resource transmission.

10. The apparatus as claimed in claim 9, where the distance threshold is configured based upon an acceptable timing advance threshold or a cyclic prefix length.

11. The apparatus of claim 1, wherein the at least one preconfigured uplink resource configuration that has the associated validity time during which the at least one preconfigured uplink resource configuration is valid for performing the preconfigured uplink resource transmission using the preconfigured uplink resource is received from a network.

12. The apparatus as claimed in claim 1, wherein the one or more location related information further comprises elevation angle information of the one or more satellite.

13. The apparatus of claim 1, wherein the serving cell identifier (ID) information of the one or more location related information indicates the location of the apparatus.

14. The apparatus of claim 1, wherein the one or more location related information comprises reference signal received power gradient information.

15. The apparatus of claim 14, wherein the reference signal received power gradient information indicates the location of the apparatus.

16. An apparatus comprising:
at least one processor; and
at least one memory storing instructions that, when executed by the at least one processor, cause the apparatus at least to:
receive location related information, wherein the location related information comprises serving cell identifier (ID) information and information based upon location related to at least one satellite;
determine a timing advance, wherein the determining of the timing advance is at least partially based upon the location related information including ephemeris information of the one or more satellite, wherein the ephemeris information used to determine the timing advance comprises an orbital position of the one or more satellite;
determine whether the timing advance is valid;
determine to perform a preconfigured uplink resource transmission using a preconfigured uplink resource, in response to determining that the timing advance is valid;
wherein the preconfigured uplink resource transmission is performed based on at least one preconfigured uplink resource configuration that has an associated validity time during which the at least one preconfigured uplink resource configuration is valid for the performing of the preconfigured uplink resource transmission using the preconfigured uplink resource; and
perform at least one or more of the following in response to determining that the timing advance is valid: skip a first step of a random access procedure, or skip a second step of the random access procedure.

17. The apparatus as claimed in claim 16, wherein the first step of the random access procedure is skipped, the first skipped step comprising a msg1 message, in response to determining that the timing advance is valid.

18. The apparatus of claim 16, wherein the second step of the random access procedure is skipped, the second skipped step comprising a msg2 message, when the timing advance is determined to be valid.

19. An apparatus of a network, the apparatus comprising:
at least one processor; and
at least one memory storing instructions that, when executed by the at least one processor, cause the apparatus at least to:
 receive one or more location related information, wherein the one or more location related information comprises serving cell identifier (ID) information and information based upon location related to one or more satellite;
 determine a timing advance, wherein the determining of the timing advance is at least partially based upon the one or more location related information including ephemeris information of the one or more satellite, wherein the ephemeris information used to determine the timing advance comprises an orbital position of the one or more satellite;
 determine to perform a preconfigured uplink resource transmission using a preconfigured uplink resource, based at least partially on the determined timing advance;
 wherein the preconfigured uplink resource transmission is performed based on at least one preconfigured uplink resource configuration that has an associated validity time during which the at least one preconfigured uplink resource configuration is valid for the performing of the preconfigured uplink resource transmission using the preconfigured uplink resource;
 determine to:
  use global navigation satellite system information to determine a location of a user equipment, or
  use at least positioning assistance data to determine the location of the user equipment, or
  use the one or more location related information to determine or validate the location of the user equipment; and
 determine to transmit a physical random access channel signal.

20. An apparatus as claimed in claim 19, wherein for the determining to use the global navigation satellite system information to determine a location of the user equipment, the apparatus is configured to cause use of at least one of:
a relaxed measurement mode,
a $N^{th}$ preconfigured uplink resource occasion, or
a timing advance expiration.

21. The apparatus as claimed in claim 19 wherein the one or more location related information comprises at least one of:
reference signal received power level information,
reference signal received power gradient information,
elevation angle information, or
Doppler shift information.

22. The apparatus of claim 19, wherein the instructions, when executed by the at least one processor, cause the apparatus at least to:
compare the location of the user equipment to a threshold; and
determine, based on a result of the comparing, to:
 perform the preconfigured uplink resource transmission, or
 transmit the physical random access channel signal.

23. The apparatus as claimed in claim 22, wherein the at least one memory stores instructions that, when executed by the at least one processor, cause the apparatus at least to compare an absolute value of a current location of the user equipment versus a former location of the user equipment to the threshold.

* * * * *